US005260403A

United States Patent [19]

Yamaguchi et al.

[11] Patent Number: 5,260,403

[45] Date of Patent: Nov. 9, 1993

[54] COLOR-DEVELOPING COMPOSITION, AQUEOUS SUSPENSION OF THE COMPOSITION, AND COLOR-DEVELOPING SHEET PRODUCED USING THE SUSPENSION AND SUITABLE FOR USE IN PRESSURE-SENSITIVE COPYING PAPER

[75] Inventors: Keizaburo Yamaguchi, Chiba; Yoshimitsu Tanabe; Kiyoharu Hasegawa, both of Yokohama; Akihiro Yamaguchi, Kamakura, all of Japan

[73] Assignee: Mitsui Toatsu Chemicals, Inc., Tokyo, Japan

[21] Appl. No.: 906,887

[22] Filed: Jul. 2, 1992

[30] Foreign Application Priority Data

Jul. 3, 1991 [JP] Japan .................... 3-162979
Feb. 14, 1992 [JP] Japan .................... 4-27612

[51] Int. Cl.[5] .................... C08G 83/00; B41M 5/16

[52] U.S. Cl. .................... 528/86; 528/205; 528/206; 528/392; 503/210; 503/211; 503/212; 503/216; 503/225; 428/328; 428/342; 428/913; 428/914

[58] Field of Search .................... 528/86, 205, 206, 392; 524/503, 504, 508; 428/328, 342, 913, 914; 503/210, 211, 212, 225, 216

[56] References Cited

U.S. PATENT DOCUMENTS

| | | | |
|---|---|---|---|
| 4,046,941 | 9/1977 | Saito | 428/328 |
| 4,260,179 | 4/1981 | Yamaguchi et al. | 428/342 |
| 4,783,521 | 11/1988 | Yamaguchi et al. | 528/206 |
| 4,835,135 | 5/1989 | Umeda et al. | 428/432 |
| 4,879,368 | 11/1989 | Botta | 528/397 |
| 4,929,710 | 5/1990 | Scholl | 528/397 |
| 4,952,648 | 8/1990 | Yamaguchi | 528/206 |
| 5,023,366 | 6/1991 | Yamaguchi | 562/475 |

FOREIGN PATENT DOCUMENTS

| | | |
|---|---|---|
| 0303443 | 2/1989 | European Pat. Off. . |
| 40-9309 | 5/1965 | Japan . |
| 42-20144 | 7/1967 | Japan . |
| 49-10856 | 3/1974 | Japan . |
| 51-25174 | 7/1976 | Japan . |
| 51-115449 | 10/1976 | Japan . |
| 52-1327 | 1/1977 | Japan . |
| 54-148614 | 11/1979 | Japan . |
| 55-1195 | 1/1980 | Japan . |
| 62-84045 | 4/1987 | Japan . |
| 63-112537 | 5/1988 | Japan . |
| 63-132857 | 6/1988 | Japan . |
| 63-186729 | 8/1988 | Japan . |
| 63-254124 | 10/1988 | Japan . |
| 63-289017 | 11/1988 | Japan . |
| 64-56724 | 3/1989 | Japan . |
| 64-77575 | 3/1989 | Japan . |
| 1-133780 | 5/1989 | Japan . |
| 2-91042 | 3/1990 | Japan . |
| 2025940 | 1/1980 | United Kingdom . |

OTHER PUBLICATIONS

CA 116(4): 31528w.
CA 111(2): 15393q.
CA 115(4): 38741y.
CA 110(20): 183051z.
CA 112(8): 66814f.
CA 109(24): 219657x.
CA 112(2): 14317b.
CA 111(22): 205551n.
CA 110(20): 174415u.
CA 110(10): 85596m.
CA 115(10: 100633v.

*Primary Examiner*—John Kight, III
*Assistant Examiner*—P. Hampton-Hightower
*Attorney, Agent, or Firm*—Millen, White, Zelano, & Branigan

[57] ABSTRACT

A color-developing sheet for pressure-sensitive copying paper sheets is obtained using an aqueous suspension of a color-developing composition containing a multivalent metal salt of a salicylic acid resin obtained from a salicylic acid ester and a mixture of styrenes which include a styrene dimer, which aqueous suspension is obtained by finely wet-grinding the color-developing composition in the presence of at least one anionic, water-soluble, high-molecular weight substance selected from (a) polyvinyl alcohol derivatives containing at least one sulfonic acid group thereof and salts thereof and (b) polymers and copolymers containing as an essential component a styrenesulfonic acid salt.

15 Claims, 3 Drawing Sheets

COLOR-DEVELOPING COMPOSITION, AQUEOUS SUSPENSION OF THE COMPOSITION, AND COLOR-DEVELOPING SHEET PRODUCED USING THE SUSPENSION AND SUITABLE FOR USE IN PRESSURE-SENSITIVE COPYING PAPER

BACKGROUND OF THE INVENTION

1) Field of the Invention

This invention relates to a novel color-developing composition comprising a multivalent-metal-modified salicylic acid resin and also to an aqueous suspension of the composition. The color-developing composition is usable in pressure-sensitive copying paper sheets, heat-sensitive recording paper sheets, copying ink compositions, color-developing agents for transfer-type copying paper sheets, and the like.

2) Description of the Related Art

Pressure-sensitive copying paper sheets are also called "carbonless copying paper sheets". They produce a color by mechanical or impactive pressure, for example, by writing strokes or typewriter impression, thereby enabling one to make a plurality of copies at the same time. Among such pressure-sensitive copying paper sheets, are those called "transfer type copying paper sheets", those called "self-contained copying paper sheets", etc. Their color-producing mechanisms are each based on a color-producing reaction between an electron-donating colorless dyestuff precursor and an electron-attracting color-developing agent.

In general, a pressure-sensitive copying paper sheet is formed of a sheet (CB-sheet), which is coated with microcapsules of a non-volatile organic solvent containing an electron-donating organic compound (pressure-sensitive dyestuff), and another sheet (CF-sheet), which is coated with an aqueous coating formulation containing an electron-attracting color-developing agent, with their coated sides maintained in a face-to-face contiguous relationship. The microcapsules are ruptured by the above-described printing pressure, so that the pressure-sensitive dyestuff solution is caused to flow out into contact with the color-developing agent to develop a color. By changing the combination of a microcapsule layer, which contains a pressure-sensitive dyestuff, and a color-developing layer, it is possible to make a plurality of copies or to produce pressure-sensitive copying paper sheets capable of producing a color individually (SC-sheets).

Taking a pressure-sensitive copying paper of the transfer type by way of example, it will be described with reference to FIG. 1 which is a schematic cross-sectional view showing the structure of the illustrative pressure sensitive copying paper sheet.

The back sides of a CB-sheet 1 and CF/CB-sheet 2 are coated with microcapsules 4 which have diameters of from several micrometers to somewhat greater than 10 micrometers obtained by dissolving a colorless pressure-sensitive dyestuff precursor in a non-volatile oil and then encapsulating the resultant pressure-sensitive dyestuff precursor solution with a high molecular film such as gelatin film. On the other hand, the front sides of the CF/CB-sheets 2 and a CF-sheet 3 are coated with a coating formulation containing a color-developing agent 5 which has such properties that upon contact with the pressure-sensitive dyestuff precursor, the color-developing agent 5 undergoes a reaction with the dyestuff precursor, thereby causing the dyestuff precursor to product its color. In order to make copies, they are stacked in the order of the CB-sheet, (CF/CB-sheet) and CF-sheet with the sides coated with the dyestuff precursor maintained in contiguous relation with the sides coated with the color-developing agent. When a pressure is applied locally by a ball-point pen 6 or a typewriter, the capsules 4 thereunder are ruptured. As a result, the solution containing the pressure-sensitive dyestuff precursor is transferred to the color-developing agent 5 so that one or more copied records are obtained.

Illustrative colorless or light-colored dyestuff precursors usable in such pressure-sensitive copying paper sheets include:

Triarylmethanephthalide compounds such as Crystal Violet lactone.
Fluoran compounds such as 3-dibutylamino-6-methyl-7-anilinofluoran.
Pyridylphthalide compounds.
Phenothiazine compounds.
Leucoauramine compounds.

One or more dyestuff precursors selected from these dyestuff precursors are dissolved in a hydrophobic high-boiling-point solvent and microencapsulated for us in the production of pressure-sensitive copying paper sheets.

As electron-attracting color-developing agents, there have been proposed (1) inorganic solid acids such as acid clay and attapulgite, as disclosed in U.S. Pat. No. 2,712,507; (2) substituted phenols and diphenols, as disclosed in Japanese Patent Publication No. 9309/1965; (3) p-substituted phenol-formaldehyde polymers and multivalent-metal-modified products thereof, as disclosed in Japanese patent Publication No. 20144/1967; (4) metal salts of aromatic carboxylic acids, as disclosed in Japanese Patent Publication Nos. 10856/1974, 25174/1976 and 1327/1977, and Japanese Patent Laid-Open Nos. 148614/1979, 84045/1987, 132857/1988, 112537/1988 and 91042/1990. Some of them have already been employed commercially.

Performance requirements which a color-developing sheet should satisfy include (1) high density color marks produced at room temperature, (2) small density reduction in the produced color marks during long-term storage, (3) high speed color-developing of the color marks especially at low temperatures, (4) reduced yellowing of paper surface during storage or upon exposure to radiant rays such as sunlight, (5) high resistance of the produced color marks to disappearance or fading upon contact with water or a plasticizer, (6) high resistance of the produced color marks to fading upon exposure to radiant rays such as sunlight.

Color-developing agents which have been proposed to date and sheets coated with such conventional color-developing agents have both advantages and disadvantages as will be described next.

1. Inorganic solid acids:

For example, inorganic solid acids are inexpensive but adsorb gas and moisture from the air during storage. They hence result in yellowing of paper surfaces and reduced color-producing performance. Color marks produced using inorganic solid acids undergo substantial fading when exposed to radiant rays such as sunlight.

2. Substituted phenols:

Substituted phenols have insufficient color-producing produce ability and produced color marks which have a low color density. At low temperatures, the color-developing speed is low. 3. p-Substituted phenol-formaldehyde polymers:

p-Phenylphenol-novolak resins which are primarily employed as p-substituted phenol-formaldehyde polymers are excellent in the density of color marks produced therefrom, the color-developing speed at low temperatures and the resistance to water or a plasticizer, but paper sheets coated with them undergo yellowing and color marks produced therefrom fade significantly upon exposure to radiant rays such as sunlight or during storage (especially, by nitrogen oxides in the air).

4. Metal salts of aromatic carboxylic acids:

As color-developing agents capable of improving the drawbacks of conventional color-developing agents, some metal salts of aromatic carboxylic acids, especially metal salts of salicylic acid derivatives have been proposed. When these color-developing agents are used in copying or recording paper sheets, the coated paper surfaces are imparted with improved yellowing resistance but the low-temperature color-developing ability, water or plasticizer resistance, light fastness and the like, which have heretofore been considered to present problems, cannot be considered improved.

Some methods have been proposed with a view toward improving these drawbacks. For example, with a view toward improving light fastness or water or plasticizer resistance, Japanese Patent Publication No. 1195/1980 (which corresponds to U.S. Pat. No. 4,046,941) proposes to use a compatible resin in combination with a salicylic acid compound. Such a method is certainly effective for the improvement of waterproofness and light fastness but is still insufficient with respect to the color-developing speed at low temperatures and the density of color marks produced at low temperatures.

Effects of a salicylic acid compound as a color-developing agent are dependent on its substituent group or groups. Therefore, color-developing ability is generally low even when a metal salt of salicylic acid is used in combination with a compatible resin. Introduction of at least one aromatic substituent group into the skeleton of salicylic acid is therefore an essential requirement for salicylic compounds to be used in accordance with such a method.

In attempts to improve the low-temperature color-developing ability and the water or plasticizer resistance, some methods have been proposed in recent years to resinify salicylic acid and to use its metal-modified products.

Examples of such attempts include metal-modified polybenzylsalicylic acids obtained from salicylic acid and a benzyl halide, as disclosed in Japanese Patent Laid-Open No. 132857/1988 (U.S. Pat. No. 4,879,368); metal-modified salicylic acid resins obtained from salicylic acid and styrenes, as disclosed in Japanese Patent Laid-Open No. 112537/1988 (U.S. Pat. No. 4,929,710); and metal-modified salicylic resins formed from salicylic acids and various benzyl derivatives, as proposed by the present inventors and disclosed in (1) Japanese Patent Laid-Open No. 186729/1988, (2) Japanese Patent Laid-Open No. 254124/1988, (3) Japanese Patent Laid-Open No. 289017/1988, and (4) Japanese Patent Laid-Open No. 56724/1989 and (5) Japanese Patent Laid-Open No. 77575/1989, which in combination correspond to U.S. Pat. No. 5,023,366.

It is stated as an advantage that the low-temperature color-developing speed and waterproofness are generally improved to significant extents when these metal-modified salicylic acid resins are used as color-developing agents.

There is, however, an outstanding demand for further improvements in light fastness with respect to the above-described multivalent-metal-modified salicylic acid resins. It is known, as a matter of fact, that the light fastness of color marks produced by using such a color-developing agent varies fractionally depending on the structure, molecular weight distribution and the like of the resin. Namely, the light fastness of produced color marks tends to improve when there is a substituent group such as an alkyl group at the α carbon of a benzyl compound relative to salicylic acid in the structure of the resin. Further, random bonding is generally considered more preferable than linear bonding in the manner of bonding of a resin, and broader molecular weight distribution is generally considered more preferable.

Based on those findings, the present inventors previously proposed a process for the production of an improved multivalent-metal-modified salicylic acid resin in Japanese Patent Laid-Open No. 133780/1989 (U.S. Pat. No. 4,952,648). According to the process, a styrene is reacted with a salicylic acid ester to obtain a salicylic acid ester resin having a broad molecular weight distribution. After the salicylic acid ester resin is hydrolyzed, the resulting salicylic acid resin is reacted with a multivalent metal salt so that a multivalent-metal-modified salicylic acid resin is obtained. In the resin obtained in accordance with this process, its structure and molecular weight distribution have been improved in a preferred direction. There is, however, an outstanding demand for still further improvements.

To produce a pressure-sensitive copying paper sheet using a color-developing agent, the color-developing agent is generally wet-ground in the presence of a surfactant so that the color-developing agent is formed as fine particles having a particle size of 1-10 μm into an aqueous suspension. Upon formation of the suspension, a dispersant is also used. The selection of a combination of particles to be dispersed and a dispersant for the provision of a good dispersion system practically one relies upon experience in many instances, since there is no general rule to follow. When a dispersant is chosen, it is necessary to take into account not only its dispersing ability but also its interaction with the dispersed particles. For example, for phenol-formaldehyde condensation products which have been employed as color-developing agents in pressure-sensitive copying paper sheets, an anionic high molecular surfactant of the polycarboxylic acid type, specifically the sodium salt of a maleic anhydride-diisobutylene copolymer is usually used as a dispersant. If this dispersant is used upon formation of the color-developing composition, which comprises the above-described multivalent-metal-modified salicylic acid resin, into an aqueous suspension, a complex is, however, inconveniently formed between the multivalent metal and the carboxylic acid salt, resulting in a substantial reduction in the dispersing ability and dispersion stability, the production of stable foams, changes in the physical properties of the color-developing agent due to modifications of the multivalent-metal-modified salicylic acid resin as a dispersoid, etc. It is therefore impossible to obtain any practically usable aqueous suspension. Salts of naphthalenesulfonic acid-formaldehyde condensation products, salts of ligninsulfonic acid, and the like—which were previously employed for color-developing agents of the phenol-formaldehyde condensation products—include those capable of showing dispersing ability for color-developing compositions comprising a multivalent-metal-modified salicylic acid resin. When they are employed in pressure-sensitive copying paper sheets, the pressure-sensitive copying paper sheets are accompanied by a drawback such as coloration, light yellowing or the like of the paper surfaces due to the dispersants themselves so that such dispersants substantially lack practical utility.

It is accordingly not easy to combine a color-developing composition, which comprises the above-described multivalent-metal-modified salicylic acid resin, with a suitable dispersant into an aqueous suspension having good quality in various properties such as dispersibility, stability and color-developing ability.

SUMMARY OF THE INVENTION

A first object of this invention is to provide a color-developing agent which can be prepared at low cost and can provide a color-developing sheet capable of producing color marks which are satisfactory in waterproofness, plasticizer resistance; light fastness and long-term stability and which exhibit satisfactory color-developing ability at low temperatures.

A second object of this invention is to provide an aqueous suspension which uses the above-described color-developing agent, has good storage stability, coating stability and the like, and can be used extremely conveniently for the production of pressure-sensitive copying paper sheets. It is also an object of this invention to provide an aqueous suspension which enables the production of high-quality pressure-sensitive copying paper sheets free from quality variations during storage, such as coloration or light yellowing of the paper surfaces.

To achieve the above-described objects, the present inventors have conducted intensive research. As a result, it has been found that the above-described performance can be improved significantly by the introduction of a styrene into the structure of a multivalent-metal-modified salicylic acid resin via a site other than the benzene ring of the styrene itself, that is, in a side chain of the styrene, thereby leading to the completion of the present invention.

In one aspect of the present invention, there is thus provided a color-developing composition comprising a multivalent-metal-modified salicylic acid resin having a softening point of 50°-180° C. and a weight average molecular weight of 500-10,000, said resin having been obtained from:

(A) a salicylic acid ester represented by the following formula (I):

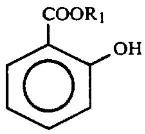
(I)

wherein $R_1$ means an alkyl group having 1-12 carbon atoms, an aralkyl group, an aryl group or a cycloalkyl group, (B) a styrene represented by the following formula (II):

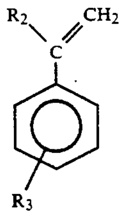
(II)

wherein $R_2$ means a hydrogen atom or a methyl group and $R_3$ denotes a hydrogen atom or an alkyl group having 1-4 carbon atoms, and (C) a styrene dimer represented by the following formula (III) and/or (IV):

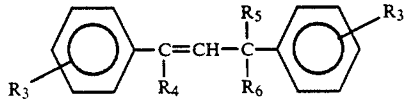
(III)

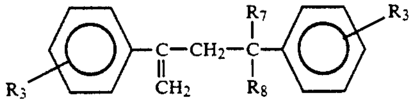
(IV)

wherein $R_3$ has the same meaning as defined above and $R_4$-$R_8$ mean a hydrogen atom or a methyl group by processing the salicylic acid ester (A), the styrene (B) and the styrene dimer (C) through the following consecutive steps i) to iii):

i) reacting a mixture of the styrene (B) and the styrene dimer (C) with the salicylic acid ester (A) to produce a salicylic acid ester resin, ii) subjecting the salicylic acid ester resin obtained in step i) to hydrolysis, thereby producing a salicylic acid resin, and iii) reacting the salicylic acid resin obtained in step ii), with a multivalent metal salt to convert the salicylic acid resin into its multivalent metal salt. The molar ratio of the salicylic acid ester (A) to the styrene (B) plus twice the styrene dimer (C) $[(A)/\{(B)+2(C)\}]$ ranges from 1/1.5 to 1/20 with the weight ratio of the styrene (B) to the styrene dimer (C) $[(B)/(C)]$ being in a range of from 5/95 to 95/5.

In another aspect of this invention, there is also provided an aqueous suspension of a color-developing composition comprising a multivalent-metal-modified salicylic acid resin, which aqueous suspension has been prepared by finely wet-grinding the above color-developing composition in the presence of at least one anionic, water-soluble, high molecular substance selected from the group consisting of:

a) polyvinyl alcohol derivatives containing at least one sulfonic acid group in the molecules thereof, and salts thereof; and b) polymers and copolymers containing as an essential component a styrenesulfonic acid salt represented by the following formula (V):

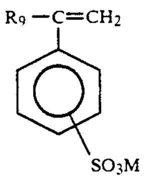

(V)

wherein $R_9$ means a hydrogen atom or an alkyl group having 1-5 carbon atoms and M denotes $Na^+$, $K^+$, $Cs^+$, $Fr^+$ or $NH_4^+$.

Compared with a color-developing sheet using a metal salt of a salicylic acid compound as a typical example of metal salts of aromatic carboxylates, a color-developing sheet making use of the color-developing composition of this invention has been improved in the water and plasticizer resistance, light fastness and long-term stability of produced color marks, color-developing ability at low temperatures, etc. It is also possible to provide at low cost a high-performance color-developing agent improved in the stability to light compared with multivalent-metal-modified salicylic acid resins obtained by known processes.

The present invention provides an aqueous suspension which is good in dispersion properties, storage stability, coating stability and which the like and can be used very conveniently for the fabrication of pressure-sensitive copying paper sheets. Further, use of the aqueous suspension of this invention makes it possible to fabricate high-quality, pressure-sensitive copying paper sheets which are excellent in the stability of produced color marks (light fastness, waterproofness, solvent resistance, writing instrument resistance, plasticizer resistance, etc.) and undergo no quality variations, such as coloration an which light yellowing of paper surfaces, during storage.

BRIEF DESCRIPTION OF THE DRAWINGS

The above and other objects, features and advantages of the present invention will become apparent from the following description of the invention and the appended claims, taken in conjunction with the accompanying drawings, in which:

DETAILED DESCRIPTION OF THE INVENTION AND PREFERRED EMBODIMENTS

Figure 1:
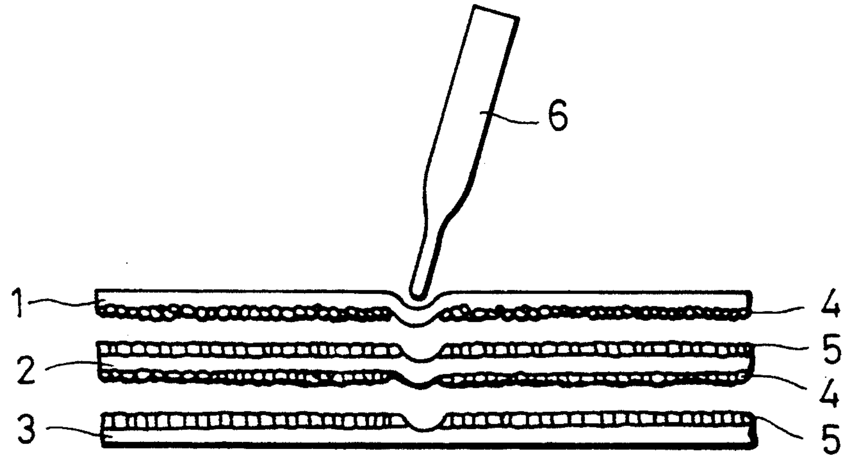
FIG. 1 is a schematic cross-sectional view showing the structure of a pressure-sensitive copying paper sheet.

The color-developing composition according to this invention, because it employs a salicylic ester resin produced by reacting the styrene dimer of the formula (III) and/or (IV) and the styrene of the formula (II) in combination with the salicylic acid ester of the formula (I), portions having a branched structure of a bonding type other than the usual bonding type are contained in the hydrolyzed multivalent-metal-modified resin. According to the usual bonding type, there is contemplated a structure in which a styrene molecule is bonded via the α carbon atom thereof to the benzene ring of the salicylic acid and some styrene molecules are bonded via the α carbon atoms thereof to the styrene molecule so bonded to the benzene ring of the salicylic acid.

In contrast, the structure of the resin according to this invention contains branched portions in addition to the resin structure described above. Such a resin structure can be fragmentarily shown by an irregular resin structure containing such a styrene dimer component as exemplified by the following formula (VI) or (VII):

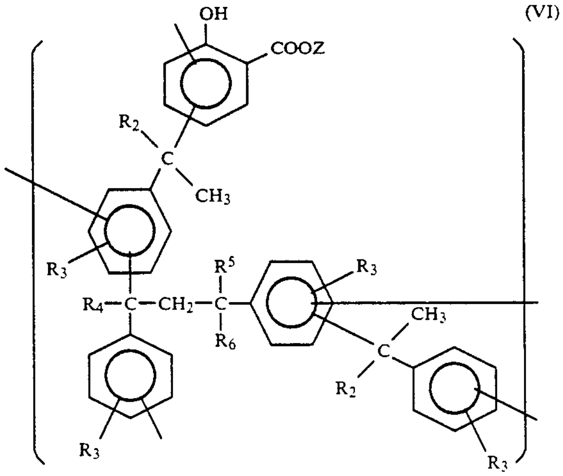

(VI)

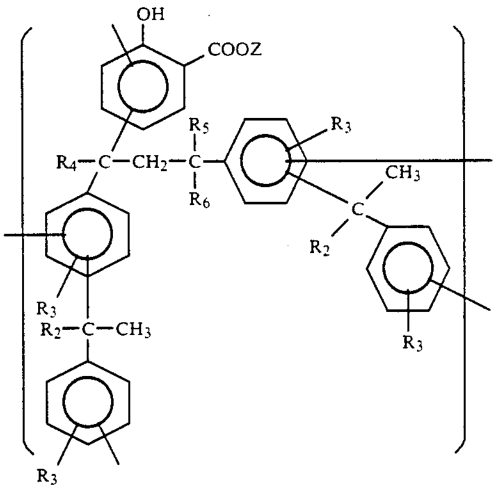

(VII)

wherein Z means M'/m, M' being a metal ion whose valency is m and m being an integer, $R_2$, $R_3$, $R_4$, $R_5$ and $R_6$ have the same meanings as defined above in the definitions for the formulae (II) and (III). As a result, the molecular weight distribution of the resin is broadened substantially, leading to improved performance as a color-developing agent.

This means that the multivalent-metal-modified salicylic acid resin according to the present invention can produce color marks having improved light fastness and long-term stability over color marks produced by using a color developing agent derived from a salicylic acid ester and a styrene as disclosed in Japanese Patent Laid-Open No. 133780/1989 referred to above.

A marked significant difference is observed in stability between the former color marks and the latter color marks, especially when exposed to sunlight.

This difference is believed to be attributed not only to the illumination of light consisting of rays in the entire wavelength range of sunlight rather than rays in a narrow wavelength range (350–450 nm) from a carbon arc lamp but also, as another important cause, the occurrence of oxidative deterioration.

Under exposure conditions equivalent to the exposure to outdoor sunlight for 5 clear days, the degree of deterioration of color marks produced using the color-developing agent disclosed in Japanese Patent Laid-Open No. 133780/1989 is 18 points, while that of color marks produced by using the color-developing agent obtained in accordance with this invention and containing the branched structure was in a range of from 11 points to 15.3 points (see Examples 1–6 and Comparative Example 1).

Such a difference can be distinguished as a clearer difference when observed visually. Even color-developing sheets which have not been used for color production undergo similar light deterioration, so that the above difference is also recognized. When the color-developing ability of an unused color-developing sheet making use of the color-developing agent according to this invention, in which the branched structure has been introduced, and that of an unused color-developing sheet obtained by using the conventional resin are tested after both the color-developing sheets have been exposed under the conditions equivalent to the exposure to outdoor sunlight for 5 clear days, the former color-developing sheet (decreased by 4.1–6.1 points) is deteriorated less in color-developing performance than the latter color-developing sheet (decreased by 7.2 points) (see Examples 1–6 and Comparative Example 1).

Such deterioration of produced color marks as well as such deterioration in performance of unused color-developing sheets have posed serious problems from the standpoint of the long-term storage stability of pressure-sensitive copying paper sheets.

One of objects of this invention was to find out an effective method for the solution of the problem. The above problem was solved by the introduction of the branched structure into the structure of the multivalent-metal-modified salicylic acid resin which is employed as a color-developing agent.

The introduction of the branched structure into the structure of the resin was achieved by using a styrene in which a styrene dimer has been added in advance by reaction of the styrene with a salicylic acid ester.

Details, however, have not been elucidated regarding possible reasons why the color-developing agent, which comprises the complex resin composition containing such a branched structure, can provide excellent light fastness and long-term stability when employed in color-developing sheets.

It is, however, believed that the above advantages is the result of the inhibition of flow of electrons or radicals to the multivalent-metal-modified salicylic acid resin as the chromogenic reactant.

The color-developing composition according to this invention may contain self-condensation resins of the styrene derivatives which are free of salicylic acid moieties. The total content of these self-condensation resins should be limited to 50 wt.% at most. Since these self-condensation resins ar not dissolved in a dilute aqueous alkaline solution, they can be separated from the alkaline solution at the stage that they are hydrolyzed into the corresponding salicylic acid resins.

In the color-developing composition of this invention, it is possible to confirm the existence of branched portions in the structure of the salicylic acid resin, said branched portions comprising the styrene dimer. This can be conducted, for example, by column chromatography or by neutralizing the above aqueous alkaline extract to obtain only a resin component containing salicylic acid and then analyzing the resin component in accordance with $^1$H-NMR. Described specifically, the existence of the branched portions can be determined by confirming methylene protons (2–2.7 ppm) present at the branched portions.

The color-developing composition according to this invention can be obtained through a first stage reaction in which a mixture of the styrene and styrene dimer is reacted with the salicylic acid ester, a second stage reaction in which the salicylic acid ester resin obtained by the first stage reaction is hydrolyzed, and a third stage reaction in which the salicylic acid resin obtained by the second stage reaction is reacted with the multivalent metal compound.

A process for directly reacting the styrene to the salicylic acid is disclosed in Japanese Patent Laid-Open NO. 84045/1987 (U.S. Pat. No. 4,748,259).

The reactivity of salicylic acid containing the electron-attracting groups is low. In the above processes, the reactions are therefore conducted at an elevated temperature while using an acid catalyst in a relatively large amount, whereby the corresponding aromatic-substituted salicylic acid compounds are obtained.

The styrene derivatives employed in the above processes tend to undergo polymerization under such severe conditions. Further, difficulties are also involved in controlling of the heat the reaction. Moreover, only two salicylic acid compounds have been obtained as these aromatic-substituted salicylic acid compounds.

This can also be attributed to the above-described low reactivity of salicylic acid, the aromatic-substituted salicylic acid compounds are not expected to be improved in color-developing ability and light and water stability. The present invention has, however, successfully achieved such improvements by increasing the proportions of their oil-soluble components and resinifying them.

According to the present invention, the salicylic ester is used to overcome such low reactivity of salicylic acid, thereby making it possible to achieve a greater molecular weight.

The production process of the color-developing composition of this invention will next be described in more detail.

According to the first stage reaction, the salicylic acid ester is reacted in the presence of a strong acid catalyst with a mixture of a styrene represented by the following formula (II):

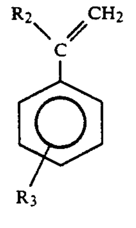

(II)

wherein $R_2$ means a hydrogen atom or a methyl group and $R_3$ denotes a hydrogen atom or an alkyl group having 1-4 carbon atoms, and a styrene dimer represented by the following formula (III) and/or (IV):

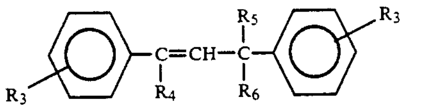
(III)

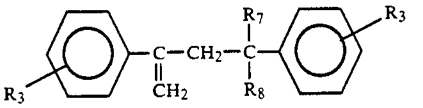
(IV)

wherein $R_3$ has the same meaning as defined above and $R_4$, $R_5$, $R_6$, $R_7$ and $R_8$ mean a hydrogen atom or a methyl group, whereby a salicylic acid ester resin is produced.

Examples of the salicylic acid ester used in the first stage reaction include, but are not limited to, methyl salicylate, ethyl salicylate, n-propyl salicylate, isopropyl salicylate, n-butyl salicylate, isobutyl salicylate, tert-butyl salicylate, isoamyl salicylate, tert-octyl salicylate, nonyl salicylate, dodecyl salicylate, cyclohexyl salicylate, phenyl salicylate, benzyl salicylate, and α-methylbenzyl salicylate. Industrially preferred is methyl salicylate for its low price.

On the other hand, illustrative of the styrene defined by the formula (II) and employed in the above reaction include, but are not limited to, styrene, o-methylstyrene, m-methylstyrene, p-methylstyrene, o-ethylstyrene, p-ethylstyrene, o-isopropylstyrene, m-isopropylstyrene, p-isopropylstyrene, p-tert-butyl-styrene and α-methylstyrene. Industrially preferred is styrene for its low price.

As the styrene dimer defined by the formula (III) or (IV), dimer compounds of the above-exemplified styrenes can be used. Specific examples of these dimer compounds include, but are not limited to, the following compounds (A)-(I).

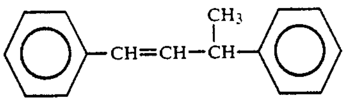
(A)

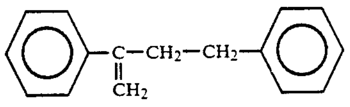
(B)

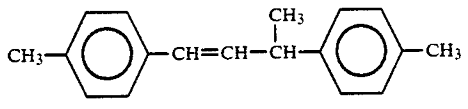
(C)

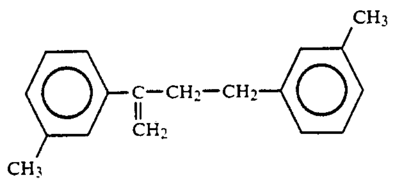
(D)

-continued

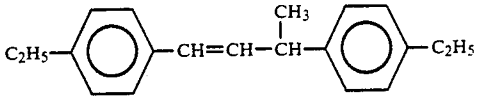
(E)

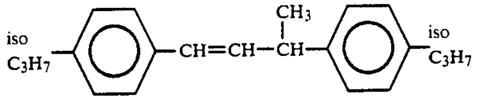
(F)

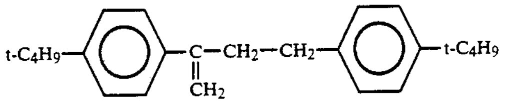
(G)

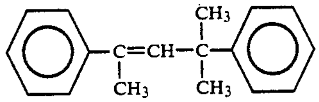
(H)

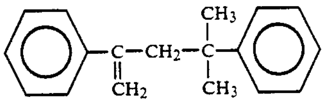
(I)

Each of these dimer compounds usually exists a mixture of two isomers in many instances. Use of such two isomers in combination causes no problem. Among the above dimer compounds, industrially preferred are the compounds (A) and (B), both derived from styrene.

Each of these styrene dimers can be easily prepared by reacting a styrene in the presence of a suitable acid catalyst. For example, the process disclosed in Japanese Patent Laid-Open No. 115449/1976 can be followed.

The present invention features the combined use of a styrene and a dimer derived therefrom. It is therefore unnecessary to separate the dimer from the styrene upon preparation of the dimer. The styrene and dimer can be used as a mixture. In addition, no problem arises even when a styrene and a dimer of another styrene, said dimer having been fractionated, are used in combination as a mixture.

In the styrene/dimer mixture used in the first stage reaction, any desired value in a range of from 5/95 to 95/5 can be chosen as the weight ratio of the styrene to the styrene dimer.

The performance of the resulting color-developing agent, however, cannot be improved beyond a certain level even if the proportion of the styrene dimer is increased in the mixture. The styrene dimer cannot exhibit its effects if its proportion is too small. In view of working efficiency and economy, the preferred weight ratio of styrene to the styrene dimer ranges from 50/50 to 95/5, with 70/30 to 90/10 being more preferred.

When one mole of the dimer is calculated as 2 moles of the styrene, these styrene derivatives can be used in an amount of 1.5-20 moles, preferably 2-10 moles per mole of the salicylic acid ester. If the styrene derivatives are used in an amount smaller than the lower limit, the compatibility of the resulting multivalent-metal-modified salicylic acid resin with a non-volatile oil contained in microcapsules of a CB-sheet and the insolubility of the multivalent-metal-modified salicylic acid resin will be impaired somewhat. If the styrene derivatives are used in an amount greater than the upper limit, the relative proportion of the salicylic acid ester is decreased so that the density of a color to be produced will not reach a desired level. The weight average molecular weight of a salicylic acid ester resin formed by using the reactants within the above ranges, respectively, is in a range of from 500 to 10,000.

The first stage reaction uses a strong acid catalyst.

Usable examples of the strong acid catalyst include mineral acids such as hydrochloric acid, sulfuric acid and phosphoric acid; Friedel-Crafts catalysts such as ferric chloride, zinc chloride, aluminum chloride, stannic chloride, titanium tetrachloride and boron trifluoride; and strong acid catalysts such as methanesulfonic acid and trifluoromethanesulfonic acid. Among these, particularly preferred is sulfuric acid for its low price. The catalyst is used in an amount of 0.05–200 wt. %, preferably 1–50 wt. % in view of economy, both based on the whole weight of the salicylic ester, styrene and styrene dimer.

The first stage reaction can be conducted using a solvent. Illustrative usable solvents include those inert to the reaction, specifically halogenated hydrocarbons such as methylene chloride, 1,2-dichloroethane, 1,1,2-trichloroethane, carbon tetrachloride, chloroform and monochlorobenzene; and organic acids such as acetic acid and propionic acid.

These solvents are used, in view of economy, in an amount 30 times (by volume/by weight) or less the total weight of the reaction raw materials.

The reaction temperature of the first stage reaction is in a range of from −20° C. to 80° C., preferably from 0° to 50° C. The reaction time ranges from 1 hour to 30 hours.

The first stage reaction can be conducted generally by charging the catalyst in the form of a solution in the salicylic ester as an organic solvent and then reacting the other reactant, i.e., the mixture of the styrene and the styrene dimer with the salicylic acid ester at a predetermined temperature while adding the mixture dropwise. Here, it is preferable to control the dropping time to at least 50% of the entire reaction time. The dropping time usually ranges from 1 hour to 20 hours. Where the solvent employed in the reaction is insoluble in water, water is added after the reaction so that the reaction mixture is washed with water in two layers. The resulting mixture is allowed to separate into two layers and the solvent is distilled off to obtain the resin. If the solvent is soluble in water, the reaction mixture is poured into water so that the resin is allowed to precipitate for collection.

To hydrolyze the salicylic acid ester resin obtained in the first stage reaction, that is, to conduct the second stage reaction, the conventional method making use of an acid or an aqueous alkaline solution can be used. In the case of hydrolysis by an acid, the hydrolysis is conducted by using water and a super strong acid, e.g., a mineral acid such as hydrochloric acid or sulfuric acid, a mixture of a mineral acid and an organic acid such as sulfuric acid and acetic acid, an organic sulfonic acid such as benzenesulfonic acid, p-toluenesulfonic acid, chlorobenzenesulfonic acid or methanesulfonic acid, a Lewis acid such as aluminum chloride, zinc chloride or stannic chloride, or a super strong acid such as trifluoromethanesulfonic acid or "Nafion H" (trade name; product of E. I. Du Pont de Nemours & Co., Inc.). In the case of hydrolysis by an alkali, it is general to use water and caustic soda or caustic potash.

Although an acid or alkali and water can be used at a desired ratio, their weight ratio generally ranges from 1:99 to 99:1, preferably from 5:95 to 95:5.

Regarding the amount of an acid or alkali to be used relative to the salicylic acid ester resin, the acid ca be used at a desired ratio relative to the salicylic acid ester resin but, generally, is used in an molar amount 0.05–30 times the amount of the salicylic acid ester resin depending on the strength of the acid. When the alkali is used, it can be used in an amount ranging from the amount equivalent to the salicylic acid ester as the raw material to the molar amount 30 times the amount of the salicylic acid ester.

The reaction temperature is in a range of 50°–200° C., preferably 80°–160° C. When the reaction is conducted at an elevated temperature, it is carried out in an autoclave under ambient pressure. The pressure ranges from 1 atm to 30 atm. The reaction time is in a range of 1–50 hours. To shorten the reaction time, a phase transfer catalyst such as a quaternary ammonium salt, quaternary phosphonium salt, crown ether, cryptate or polyethylene glycol can be added as a reaction accelerator.

Although the above reaction is usually carried out without any organic solvent, an organic solvent may be used. Illustrative usable organic solvents include aprotic polar solvents such as N-methylformamide, N,N-dimethylformamide, N,N-dimethylacetamide, dimethylsulfoxide, sulfolane, 1,3-dimethyl-2-imidazolidinone, N-methylpyrrolidone and hexamethylphosphotriamide: and glycols such as ethylene glycol, polyethylene glycol dialkyl ether, 2-methoxyethanol and 2-ethoxyethanol. Also usable are solvents immiscible with water, such as toluene, xylene, monochlorobenzene, 1,2-dichloroethane and 1,1,2-trichloroethane. The amount of the organic solvent is sufficient when it is used in an amount 0.5–10 (volume/weight) times the total amount of the raw materials.

After the completion of the reaction, the hydrolysate of the salicylic acid ester resin, namely, the salicylic acid resin can be obtained from the reaction mixture, for example, by procedures such as separation into phases, dilution and concentration.

In order to produce a metal-modified product from the salicylic acid resin, which has been produced as described above, by the third stage reaction, several known methods can be used.

For example, it can be produced by reacting an alkali metal salt of the salicylic acid resin and a water-soluble multivalent metal salt in water or in a solvent in which the alkali metal salt and the multivalent metal salt are both soluble. Namely, an alkali metal hydroxide, carbonate, alkoxide or the like is reacted with the resin to obtain a solution of the alkali metal salt of the resin in water, an alcohol or a water-alcohol mixture, followed by the reaction with the water-soluble multivalent metal salt to produce the multivalent-metal-modified resin. It is desirable to react the water-soluble multivalent metal salt in an amount of about 0.5–1 gram equivalent per mole of the salicylic acid.

The multivalent-metal-modified salicylic acid resin can also be produced by mixing the salicylic acid resin with a multivalent metal salt of an organic carboxylic acid such as formic acid, acetic acid, propionic acid, valeric acid, caproic acid, stearic acid or benzoic acid and then heating and melting the resultant mixture to react the same. In some instances to a they may be heated, molten state and reacted after adding a basic substance, for example, ammonium carbonate, ammonium bicarbonate, ammonium acetate or ammonium benzoate further.

The multivalent-metal-modified salicylic acid resin can also be produced by using the salicylic acid resin and a multivalent metal carbonate, oxide or hydroxide, heating and melting the resultant mixture to react the same, and then cooling the reaction mixture. Here, they can be reacted after adding a basic substance such as the ammonium salt of an organic carboxylic acid, for example, ammonium formate, ammonium acetate, ammonium caproate, ammonium stearate or ammonium benzoate further.

When the multivalent-metal-modified salicylic acid resin is produced by heating and melting the reactants, the reaction temperature generally ranges from 100° C. to 180° C. and the reaction time ranges from about 1 hour to about several hours although the reaction time varies depending on the composition of the resin, the reaction temperature, and the kind and amount of the multivalent metal salt employed. As the multivalent metal salt, it is desirable to use an organic carboxylate of a multivalent metal and/or the carbonate, oxide and/or hydroxide of the multivalent metal in an amount such that the multivalent metal will be contained in a proportion of from 1 wt. % to about 20 wt. % based on the total weight of the multivalent-metal-modified resin to be obtained.

There is no particular limitation on the amount of the basic substance to be used. However, it is generally used in an amount of 1-15 wt. % based on the whole weight of the metal-modified resin to be obtained. When the basic substance is used, it is preferable to use it after mixing it with the multivalent metal salt.

The softening point of the multivalent-metal-modified salicylic acid resin produced in accordance with any one of the various processes described above ranges from 50° C. to 180° C. (as measured by the ring and ball softening point measuring method set out under JIS-K-2548).

Examples of the metal of the metal-modified resin used in this invention include metals other than alkali metals such as lithium, sodium and potassium. Preferred multivalent metals include, for example, calcium, magnesium, aluminum, copper, zinc, tin, barium, cobalt and nickel. Of these, zinc is particularly effective.

The multivalent-metal-modified salicylic acid resin obtained by the process described above has excellent characteristics as a color-developing agent. To use the metal-modified resin as a color-developing agent, it is preferable to grind the metal-modified resin to a suitable particle size, for example, in a sand grinding mill before the metal-modified resin is used. To employ the color-developing agent actually, it is desirable to convert it into a desired form, for example, by suspending or dissolving it in a solvent. The color-developing agent can be used in combination with one or more known color-developing agents, namely, in combination with one or more of inorganic solid acids such as activated clay, organic polymers such as phenol-formaldehyde resin, and metal salts of aromatic carboxylates. The color-developing agent can also be used in combination with at least one of the oxides, hydroxides and carbonates of multivalent metals such as zinc, magnesium, aluminum, lead, titanium, calcium, cobalt, nickel, manganese and barium.

As a method for the fabrication of a color-developing sheet for a pressure-sensitive copying paper sheet by the color-developing agent of this invention, any one of the following methods can be employed: (1) to apply a water-base coating formulation, which makes use of an aqueous suspension of the metal-modified resin, to a base material such as a paper web; (2) to incorporate the metal-modified resin in a base paper web when the base paper web is produced; and (3) to prepare a coating formulation by using a solution or suspension of the metal-modified resin in an organic solvent and then to coat a base material with the coating formulation.

To form a color-developing layer on a base material such as paper by coating the coating formulation, the color-developing agent should desirably have a suitable viscosity and good coating applicability. The multivalent-metal-modified resin, therefore, is used by forming it into an aqueous suspension as described above in (1) or (3) or by dissolving or suspending it in a solvent and then adding kaolin clay, calcium carbonate, starch or a synthetic or natural latex to the solution or suspension to obtain a suitable viscosity and good coating applicability.

The proportion of the color-developing agent in the coating formulation is preferably 10-70% of the whole solids. If the proportion of the color-developing agent is small than 10%, it is impossible to exhibit sufficient color-producing ability. Any proportions greater than 70% result in color-developing sheets having poor paper surface characteristics. The coating formulation is applied at a rate of 0.5 $g/m^2$ or more, preferably 1-10 $g/m^2$ in terms of dry weight.

Compared with color-developing sheets using an inorganic solid acid or p-phenylphenol novolak resin, a color-developing sheet which makes use of a novel multivalent-metal-modified salicylic acid resin obtained in accordance with this invention, has either comparable or better color-producing ability, improved resistance to yellowing upon exposure to sunlight, improved resistance to a considerable extent especially to yellowing from nitrogen oxides in the air, and is extremely advantageous in handling ease and storage.

When compared with metal salts of salicylic acid compounds typical as metal salts of aromatic carboxylates, on the other hand, the color-producing ability at low temperatures, light fastness and water resistance is improved substantially. The multivalent-metal-modified salicylic acid resin according to this invention can be produced in simple steps from the inexpensive raw materials, so that it is extremely advantageous.

A description will next be made of the aqueous suspension of this invention.

Upon formation of a color-developing composition—which comprises the above-described, multivalent-metal-modified salicylic acid resin having good color-developing ability and the like—into an aqueous suspension, an anionic water-soluble high molecular substance especially suitable for the metal-modified salicylic acid resin and having excellent characteristics is used as a dispersant. The aqueous suspension of this invention can be used suitably for the fabrication of pressure-sensitive copying paper sheets. The heat-sensitive copying paper sheets so obtained have been improved in color-producing performance and the like and show extremely good performance.

Anionic water-soluble high molecular substances (a) and (b), which are useful as dispersants in the present invention, will be described.

The anionic water-soluble high molecular substances (a) are polyvinyl alcohol derivatives having a sulfonic group in their molecules or salts of the derivatives. Their polymerization degrees are 200-5000, preferably 200-2000. The sulfonic group is generally employed in the form of an alkali metal salt ($Na^+$, $K^+$, $Cs^+$ or $Fr^+$) or the $NH_4^+$ salt. Illustrative processes for the production of the high molecular substances (a) include:

(1) Vinyl acetate and a sulfonic-containing α,β-unsaturated monomer are copolymerized, followed by saponification.

(2) Polyvinyl alcohol and concentrated sulfuric acid are reacted.

(3) Polyvinyl alcohol is subjected to oxidative treatment with bromine, iodine or the like, followed by reaction with acidic sodium sulfite.

(4) A sulfonic-containing aldehyde compound is reacted with polyvinyl alcohol in the presence of an acid catalyst, so that a sulfoacetal is obtained.

Among the above processes, the process (1) is preferred.

Specific examples of the sulfonic-containing α,β-unsaturated monomer employed in the process (1) include:

(i) sulfoalkyl (meth)acrylates, for example, sulfoethyl acrylate and sulfoethyl methacrylate;

(ii) vinylsulfonic acid, styrenesulfonic acid and allylsulfonic acid;

(iii) maleimido-N-alkanesulfonic acids;

(iv) 2-acrylamido-2-methylpropanesulfonic acid, 2-acrylamido-2-phenylpropanesulfonic acid.

The high molecular substances (a) can be produced generally by copolymerizing these monomers with vinyl acetate at a ratio of 0.5–20 moles, preferably 1–10 moles to 100 moles and then saponifying (50–100%) vinyl acetate groups under alkaline conditions in a manner known per se in the art.

The high molecular substances (a) can also be obtained each by copolymerizing an aromatic α,β-unsaturated monomer such as styrene with vinyl acetate and, after sulfonation, saponifying the sulfonated copolymer. As a further alternative, the high molecular substances (a) can also be obtained each by copolymerizing an α,β-unsaturated monomer, which contains a sulfonic group in a vinyl acetate molecule, with another α,β-unsaturated monomer.

Representative examples of the anionic water-soluble high molecular substances (b), which are polymers or copolymers obtained using as an essential component the sulfonic acid represented by formula (V), are polymers containing styrenesulfonic acid or a derivative thereof as a unit in the molecules thereof. Among these, polystyrenesulfonic acid salts and poly-α-methylstyrenesulfonic acid salts having an average polymerization degree of 5–1000 can be mentioned as suitable examples. Such homopolymers can be synthesized in any way convenient. Namely, salts of polystyrenesulfonic acid derivatives can be synthesized by sulfonating polystyrene or polymerizing styrenesulfonic acid (or its salts). As a polymerization process, a known process can be employed, for example, radical polymerization at 0°–150° C., ion polymerization or the like. Specific examples of high molecular substances (b) as copolymers include salts of copolymers of styrenesulfonic acid and maleic anhydride, sulfonate salts of copolymers of styrene and maleic acid, sulfonate salts of copolymers of styrene and other vinyl monomers.

A description follows of the characteristic properties of the anionic water-soluble high molecular substances (a), (b) useful as dispersants in the present invention. In contradistinction to polyvinyl alcohols of the completely saponified or partially saponified type, each high molecular substance (a) containing sulfonic groups has high solubility in water and is easily dissolved in water, undergoes small viscosity variations over a wide pH range, and is practically colorless or extremely light-colored. As a consequence, an aqueous suspension of the color-developing composition comprising the multivalent-metal-modified salicylic acid resin is colored very little. Use of this aqueous suspension can therefore provide pressure-sensitive copying paper sheets (CF-sheets) having a high degree of whiteness. As has been described above, each polyvinyl alcohol derivative containing sulfonic groups in its molecules has excellent dispersibility for the color-developing composition comprising the multivalent-metal-modified salicylic acid resin while the polyvinyl alcohol derivative itself has the characteristics that it is not modified in properties and color even under severe environmental conditions. The polyvinyl alcohol derivative can provide an aqueous suspension which is stable thermally, mechanically and chemically. Further, in contradistinction to polyvinyl alcohols of the completely or partially saponified type or polyvinyl alcohols modified by carboxyl groups or the like, each high molecular substance (a) has low foaming property and excellent self-defoaming property so that it can overcome troubles caused by foams during dispersing work.

Each anionic water-soluble high molecular substance (b) useful in the present invention can also provide, over a wide pH range, stable aqueous solutions which are extremely light-colored.

As has been described above, each of the anionic water-soluble high molecular substances (a), (b) useful as dispersants in the present invention has extremely good dispersing ability for the color-developing composition comprising the multivalent-metal-modified salicylic acid resin, whereby the resulting aqueous suspension according to this invention is stable with high concentration and low viscosity. Moreover, the aqueous suspension is free from the problem of severe foaming tendency or difficulty in defoaming, which would arise if a conventional polyvinyl alcohol were employed.

Further, each anionic water-soluble high molecular substance (a) employed in the present invention is equipped not only with anionic properties but also with nonionic properties so that it has both excellent dispersing ability and excellent protective colloidal properties. The resulting aqueous suspension, therefore, have far superior mechanical and thermal stability to aqueous suspensions prepared using other dispersants.

A description will next be made of a method for preparing the aqueous suspension of this invention from the anionic water-soluble high molecular substance (a) or (b) and the color-developing composition comprising the multivalent-metal-modified salicylic acid resin.

Since the anionic water-soluble high molecular substances (a) and (b) are each obtained generally as a white powder which is soluble in water or an aqueous solution, they are each used in a form dissolved in water as needed. The pH of the solution is adjusted to a range of 4–10, preferably to a range of 6–9. Into the thus-prepared aqueous solution of the high molecular substance, a powder of the color-developing composition comprising the multivalent-metal-modified salicylic acid resin is charged. After the resulting mixture is stirred into a slurry, the slurry is wet-ground with a spherical grinding medium to an average particle size of 1–20 μm in a wet-grinding apparatus, for example, a ball mill, attritor or sand grinder, whereby an aqueous suspension is obtained. Such wet-grinding can be conducted by a batchwise or continuous processing method. The slurry is comminuted until a desired particle size is attained. Where the color-developing composition comprising the multivalent-metal-modified salicylic acid resin has a low softening point and is readily liquefied at a temperature not higher than the boiling point of water, an aqueous suspension can be obtained by agitating the color-developing composition at a high speed in warm or hot water and then cooling the resultant emulsion.

No particular limitation is imposed on the amount of the anionic aqueous high molecular substance (a) and/or (b) used in the present invention, because it varies depending on the substance (color-developing composition) to be dispersed and the desired physical properties (concentration, particle size, viscosity, etc.) of the aqueous suspension. To obtain a practical aqueous suspension (average particle size: 1–10 μm), however, the anionic aqueous high molecular substance (a) and/or (b) should be used in an amount of at least 0.5 parts by weight, preferably 2–30 parts by weight per 100 parts by weight of the color-developing composition comprising the multivalent-metal-modified salicylic resin. The concentration of the aqueous suspension preferably is 30–80 wt. %. Although either the anionic water-soluble high molecular substance (a) or the anionic water-soluble high molecular substance (b) can be used as a dispersant, it is preferable to use them in combination. Their combined use makes it possible to reduce the amount of the dispersant upon formation of the aqueous suspension compared with their single use, so that a more stable aqueous suspension can be obtained. Where the anionic water-soluble high molecular substances (a) and (b) are used in combination, an extremely-stable aqueous suspension can be obtained even when they are used in a total amount not greater than 10 parts by weight per 100 parts by weight of the color-developing composition. Another anionic or nonionic surfactant, water-soluble high molecular substance or the like can also be used in combination to adjust the viscosity and rheological characteristics of the aqueous suspension.

The average particle size of the color-developing composition, which comprises the multivalent-metal-modified salicylic acid resin, in the aqueous suspension is not greater than 10 μm, preferably in a range of 0.5–10 μm. If there are many particles greater than 10 μm, more sediment occurs during standstill storage of the aqueous suspension and the color-producing performance of pressure-sensitive copying paper sheets, especially the density of color marks immediately after their production is lowered. If there are many particles smaller than 0.5 μm, on the other hand, the resulting aqueous suspension has a higher viscosity, thereby making it difficult to increase the concentration and also to handle the aqueous suspension.

Upon fabrication of a pressure-sensitive copying paper sheet by using the aqueous suspension of this invention, an inorganic or organic pigment, a coating binder, a pigment dispersant, various other additives and the like are first mixed, followed by the preparation of a water-base coating formulation conforming with a coating method. The water-base coating formulation is to adjust the paper surface characteristics of the pressure-sensitive copying paper sheet. The water-base coating formulation is coated on a base material and then dried, so that the pressure-sensitive copying paper sheet is fabricated. Usable examples of the inorganic or organic pigment include kaolin, calcined kaolin, bentonite, talc, calcium carbonate, barium sulfate, aluminum oxide, silica, titanium white, titanium oxide, polystyrene emulsion, and urea resin emulsion. Illustrative usable coating binders include denatured starches such as oxidized starch, enzyme-converted starch, starch urea phosphate and alkylated starch; water-soluble proteins such as casein and gelatin; and synthetic or semisynthetic binders such as styrene-butadiene (SBR) latex, methyl methacrylate-butadiene (MBR) latex, vinyl acetate polymer emulsion, polyvinyl alcohol, carboxymethylcellulose, hydroxyethylcellulose and methylcellulose. Usable examples of the pigment dispersant include phosphoric acid salts such as sodium metaphosphate, sodium hexametaphosphate and sodium tripolyphosphate; and polycarboxylic acid salts such as sodium salt of polyacrylic acid. Usable examples of the various other additives include fluorescent brightening agents, defoaming agents, viscosity modifiers, dusting preventives, lubricants, and waterproofing agents.

A water-base coating formulation, which has been prepared by mixing and dispersing the aqueous suspension of this invention and the above-described various components, is coated on a base material such as a paper sheet or film by an air-knife coater, blade coater, brush coater, roll coater, bar coater, gravure coater or the like, and is dried to obtain a color-developing sheet for the pressure-sensitive copying sheet. In general, the coat weight of the water-base coating formulation is at least 0.5 $g/m^2$, preferably in a range of 1–10 $g/m^2$ in term of dry weight. Although the color producing performance of the sheet coated with the water-base coating formulation is governed primarily by the concentration of the color-developing composition, which comprises the multivalent-metal-modified salicylic acid resin, in the water-base coating formulation, coat weights greater than 10 $g/m^2$ are not effective for the improvement of the color-producing performance and are disadvantageous economically.

The suitability of the water-base suspension of this invention for the fabrication of a pressure-sensitive copying paper sheet is observed specifically in the following ways. The water-base suspension of this invention has less thickening tendency so that, upon coating a water-base coating formulation containing it as a principal component, the working efficiency is significantly improved. When the air-knife coating method which requires a low-viscosity coating formulation is used for coating the water-base coating formulation described above, foaming can be conveniently reduced to a significant extent during recirculation of the water-base coating formulation. Further, upon preparation of a water-base coating formulation for use in the fabrication of a pressure-sensitive copying paper sheet, the aqueous suspension of this invention does not exhibit thickening tendency (shock) when it is mixed with another component which is generally employed, for example, a white pigment such as kaolin clay, calcium carbonate, zinc oxide or aluminum oxide. In addition, the aqueous suspension has a high solid content and excellent thermal stability so that the water-base coating formulation making use of the aqueous suspension is excellent in thermal and mechanical stability. The water-base coating formulation can therefore be applied suitably to a coater which is employed to coat a water-base coating formulation of a high solid content, in particular, to a blade coater or roll coater.

A color-developing sheet for a pressure-sensitive copying paper sheet which employs a color-developing composition comprising the multivalent-metal-modified salicylic acid resin produced as described above, is excellent in low-temperature color-producing ability, light fastness and water resistance compared with the conventionally-known color-developing agents composed of metal salts of aromatic carboxylic acids. Compared with a p-phenylphenol novolak resin, the color-developing composition comprising the multivalent-metal-modified salicylic acid resin has comparable or better color-producing ability, has been improved in the yellowing tendency upon exposure to sunlight and, especially, has significantly improved resistance to yellowing by nitrogen oxides in the air.

The present invention will hereinafter be described in detail by the following examples.

Color-developing compositions according to this invention will be described first by Examples 1–6 and Comparative Examples 1–4, and examples of the aqueous suspension of this invention will be described next by Examples 7–13 and Comparative Examples 5–8. Production of color-developing sheets for pressure-sensitive copying paper sheets, said color-developing sheets employing color-developing compositions of this invention as color-developing agents, and measurement methods of the performance of the color-developing sheets:

1. Production of color-developing sheets

The multivalent-metal-modified salicylic acid resins obtained in below-described Examples 1–6 and the compounds of below-described Comparative Examples 1–4, components were used as color-developing agents. In each example, the color-developing agent was dispersed in a sand grinding mill in accordance with the following composition so that a suspension was prepared.

| | Parts by weight |
|---|---|
| Color-developing agent | 6 |
| 10% Aq. soln. of polyvinyl alcohol ["Kuraray #117", trade name; product of KURARAY CO., LTD.] | 3 |
| Water | 22.5 |

Using the suspension, a coating formulation of the following composition was next prepared.

| | Parts by weight |
|---|---|
| Suspension | 10 |
| Light calcium carbonate | 10 |
| Starch | 0.8 |
| Synthetic rubber latex | 0.8 |
| Water | 32.5 |

The coating formulation was coated on a wood free paper web to give a dry coat weight of 5.0–5.5 $g/m^2$, followed by drying to obtain color-developing sheets. 2. Color-producing speed and produced color density (conducted in air-conditioned rooms of 5° C., 60% RH and 20° C., 65% RH, respectively)

A commercial blue-color producing CB-sheet containing Crystal Violet Lactone (CVL) as a principal pressure-sensitive dyestuff precursor ("NW-40T", trade name; product of Jujo Paper Co., Ltd.) was used. It was stacked with a sample color-developing sheet (CF-sheet) coated with a water-base coating formulation with their coated sides maintained in a contiguous relation. The thus-stacked pressure-sensitive copying paper was typed by a typewriter to produce a color.

The reflectance of the sample color-developing sheet was measured twice, namely, 1 minutes and 30 seconds after the typing and 24 hours after the typing. The results are expressed in terms of Y value.

3. Light fastness of produced color marks (3-1)

Each sample color-developing sheet, which had produced a color in the manner described above in Testing Method 2, was exposed for 2 hours (and for 4 hours) to light on a carbon arc fadeometer (manufactured by Suga Testing Machine Co., Ltd.). After the exposure, its reflectance was measured by the "Σ-80 Color Difference Meter". The results are expressed in terms of Y value.

The smaller the Y value and the smaller its difference from the Y value before the test, the less the fading by the light and the more preferable.

(3-2)

After each sample color-developing sheet, which had produced a color in the manner described above in Testing Method 2), was exposed to outdoor sunlight for 5 fine days, the reflectance was measured by the "Σ-80 Color Difference Meter". The results are expressed in terms of Y value.

4. Plasticizer resistance

DOP microcapsule coated paper sheets were prepared by forming microcapsules, which contained dioctyl phthalate (DOP) as a core substance, had an average capsule size of 5.0 μm, and were equipped with a melamine-formaldehyde resin capsule wall, adding a small amount of a starch-type binder, applying the thus-prepared coating formulation by an air-knife coater on a wood free paper web to achieve a dry coat weight of 5 $g/m^2$ and then drying the thus-coated paper web. One of the DOP microcapsule coated paper sheets and the color-developing sheet with color marks produced above in Testing Method 2 were brought into a contiguous relation with their coated sides facing each other. They were thereafter caused to pass under a linear pressure of 100 kg/cm through a super calender roll, so that DOP was allowed to penetrate uniformly into the colored surface.

One hour after the test, the reflectance of the color-developing sheet was measured by the "Σ-80 Color Difference Meter". The results are expressed in terms of Y value. The smaller the Y value and the smaller its difference from the Y value before the test, the better the plasticizer resistance of the produced color marks.

5 Waterproofness of produced color marks

Each sample color-developing sheet, which had been colored by Testing Method 2, was dipped for 2 hours in water. Density changes in the produced color marks were observed visually.

6. Yellowing property of color-developing sheets (6-1) Yellowing by $NO_x$

Following JIS L-1055 (Testing Method for $NO_x$ Gas Fastness of Dyed Materials and Dyes), each sample color-developing sheet Was stored for 1 hour in a closed Vessel of an atmosphere of $NO_x$ occurred by the reaction of $NaNO_2$ (sodium nitrite) and $H_3PO_4$ (phosphoric acid). The degree of its yellowing was investigated.

Upon an elapsed time of 1 hour after completion of the test, the reflectance of the color-developing sheet was measured by the "Σ-80 Color Difference Meter". The measurement results are expressed in terms of WB value. The greater the WB value and the smaller its difference from the WB value before the test, the smaller the yellowing property in an $NO_x$ atmosphere.

(6-2) Yellowing by exposure to light on a fadeometer

Each sample color-developing sheet was exposed for 4 hours to light on the carbon arc fadeometer (manufactured by Suga Testing Machine Co., Ltd.). After the exposure, the reflectance of the sample color-developing sheet was measured by the "Σ-80 Color Difference Meter". The measurement results are expressed in terms of WB value. The greater the WB value and the smaller its difference from the WB value before the test, the smaller the yellowing property upon exposure to light.

(6-3) Yellowing by exposure to sunlight

After each color-developing sheet was exposed to outdoor sunlight for 5 fine days, the reflectance of the sample color-developing sheet was measured by the "Σ-80 Color Difference Meter". The measurement results are expressed in terms of WB value. The WB value has the same significance as described above under (6-2). 7. Color-producing speed by exposure to sunlight and produced color density (conducted in an air-conditioned room of 20° C., 65% RH)

A commercial blue-color producing CB-sheet containing Crystal Violet Lactone (CVL) as a principal pressure-sensitive dyestuff precursor ("NW-40T", trade name; product of Jujo Paper Co., Ltd.) was used. It was stacked with a sample color-developing sheet employed above in Test (6-3) with their coated sides maintained in a contiguous relation. The thus-stacked pressure-sensitive copying paper was typed by a typewriter to produce a color. The reflectance of the sample color-developing sheet was measured twice, namely, 1 minutes and 30 seconds after the typing and 24 hours after the typing. The results are expressed in terms of Y value.

EXAMPLE 1

Charged in a glass reactor were 152.2 g (1.0 mole) of methyl salicylate, 350 g of 1,2-dichloroethane and 21.5 g of 95% concentrated sulfuric acid. To the resulting solution, 416.6 g (4.0 moles in terms of styrene) of a styrene composition containing 26 wt. % of styrene dimer were added dropwise over 5 hours in a temperature range of from 0° C. to 5° C. under vigorous stirring. The reaction mixture was subjected to aging for 2 hours at the same temperature so that the first-stage reaction wa completed. Water (350 g) was then added dropwise to the reaction mixture, followed by heating to 104° C. to distill off 1,2-dichloroethane, that is, the solvent. To the residue, 151 g (1.7 moles) of 45% caustic soda were added dropwise and the second- stage reaction was conducted 2 hours at 98°-102° C.

A portion of the reaction mixture obtained in the second-stage reaction was sampled for analysis and was neutralized with diluted sulfuric acid to pH 6 to precipitate a resinous substance. The precipitate was separated and dried in a vacuum, whereby a pale yellow, clear resin was obtained.

Figure 2:
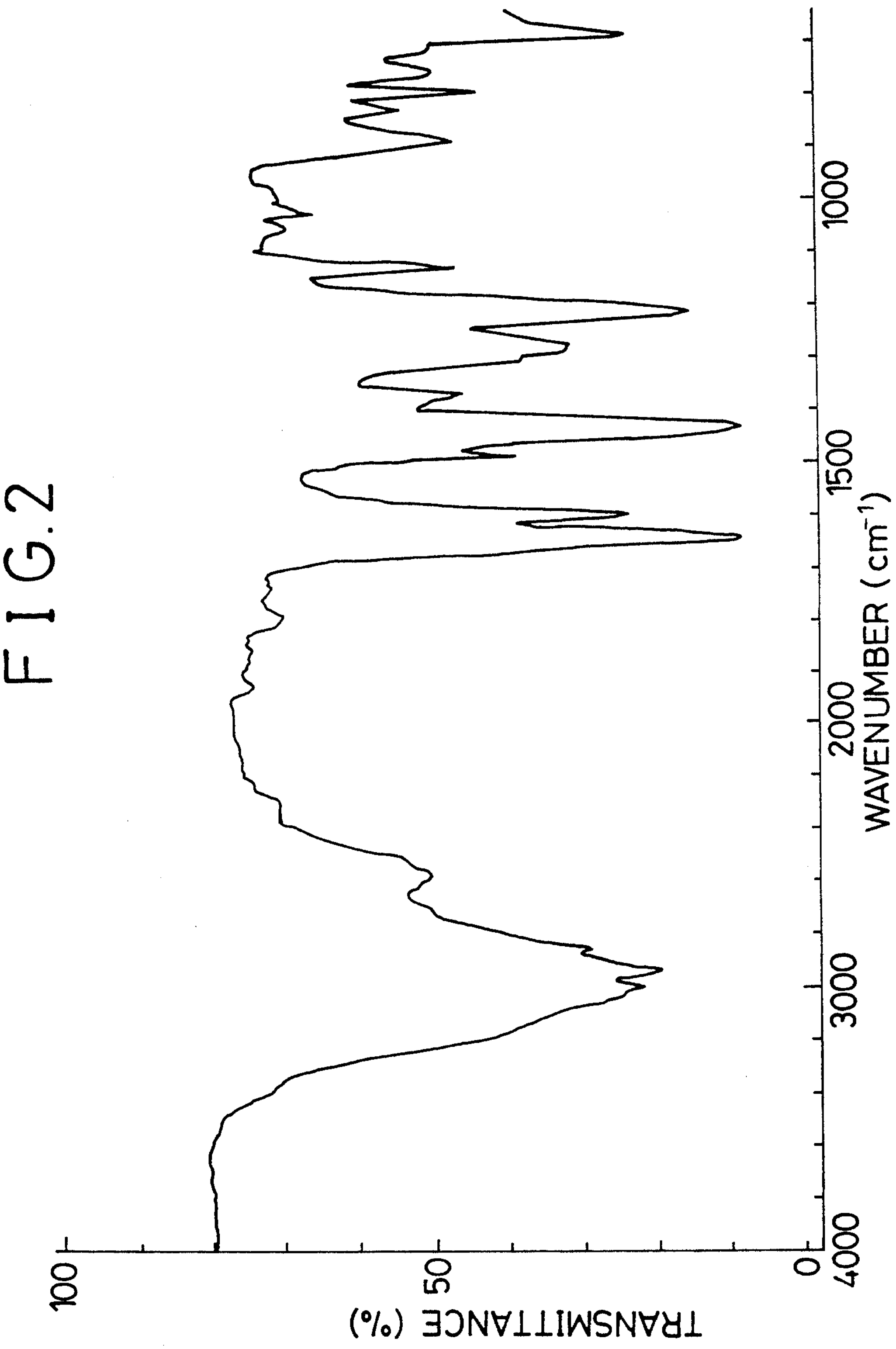
FIG. 2 is an illustrative IR spectrum of a salicylic resin obtained in the course of preparation of a color-developing composition according to this invention.
Figure 3:
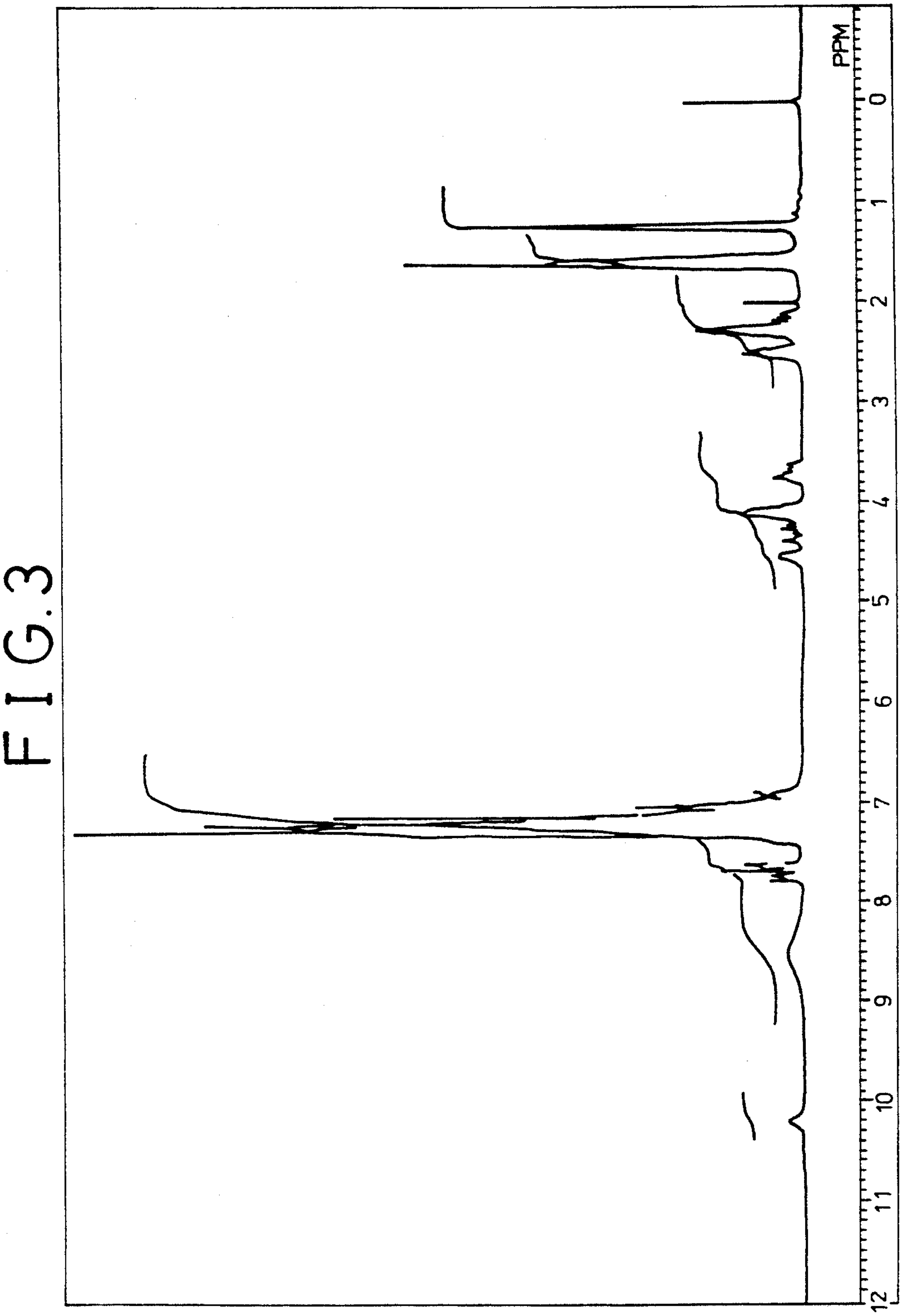
FIG. 3 is a $^1$H-NMR spectrum of the sample employed in FIG. 2.

That pale yellow, clear resin (2 g) was adsorbed on a silica gel column and then eluted with benzene solvent. The eluate was dried up, whereby 0.21 g of a component was obtained. The another component adsorbed on the silica gel column was thereafter eluted with acetone. The eluate was dried up, whereby 1.7 g of said another component were obtained. The latter component was a resin component containing salicylic acid. The result of an IR analysis by the KBr tablet method and also that of $^1$H-NMR are shown in FIG. 2 and FIG. 3, respectively.

The reaction mixture, which had been obtained in the second-stage reaction, was diluted with 2500 g of water and then adjusted to pH 10.5 with diluted sulfuric acid.

Added dropwise at 30°-35° C. over 2 hours to the resulting aqueous solution so obtained was a solution obtained by dissolving 145 g (0.5 mole) of zinc sulfate heptahydrate in 400 g of water.

The precipitate while thus obtained in the third-stage reaction was filtered, washed with water and then dried, whereby 585 g of the zinc salt of the salicylic acid resin were obtained. That resin had a softening point of 125° C. and a weight-average molecular weight of 1820.

EXAMPLE 2

In a similar manner to Example 1 except that, in the first-stage reaction, 384 g (3 moles in terms of p-methylstyrene) of a p-methylstyrene composition containing 41.5 wt. % of the dimer component derived from p-methylstyrene were used relative to 1 mole of methyl salicylate, were obtained 548 g of the zinc salt of the salicylic acid resin having a softening point of 142° C. and a Weight-average molecular weight of 1280.

EXAMPLE 3

The first-stage reaction was conducted in a similar manner to Example 1 except that 1 mole of methyl salicylate was reacted with 624 g (6 moles in terms of styrene) of a styrene composition containing 63.8 wt. % of the styrene dimer component. The second-stage reaction was thereafter conducted in a similar manner to Example 1, whereby an aqueous solution of the sodium salt of a salicylic acid resin was obtained. To the solution, 1500 ml of toluene were added, followed by neutralization with a 10% aqueous solution of sulfuric acid to pH 6. The resulting solution was allowed to stand so that the solution separated into two layers. The lower water layer was removed. Zinc oxide (41 g, 0.5 mole) was added to the thus-obtained toluene solution of the salicylic acid resin. The resultant mixture was heated while the toluene was distilled off, whereby a third-stage reaction was conducted. The reaction mixture was maintained at 145°-150° C. in a vacuum by an aspirator for 30 minutes and then discharged onto a porcelain dish, whereby the zinc salt of the salicylic acid resin was obtained in a reddish brown, clear form (yield: 775 g).

The zinc salt of the salicylic acid resin had a softening point of 97° C. and a weight-average molecular weight of 2350.

EXAMPLE 4

The first-stage reaction was conducted in a similar manner to Example 1 except that 1 mole of methyl salicylate was reacted with 416 g (4 moles in terms of styrene) of a styrene composition containing 8.5 wt. % of the styrene dimer component. Subsequent reactions were conducted as in Example 3, whereby 575 g of the zinc salt of the salicylic acid resin having a softening point of 104° C. and a weight-average molecular weight of 1620 were obtained in a reddish brown, clear form.

EXAMPLE 5

The first-stage reaction was conducted in a similar manner to Example 1 except that 1 mole of methyl salicylate was reacted with 520 g (5 moles in terms of styrene) of a styrene composition containing 17 wt. % of the styrene dimer component while using 38.0 g of 95% concentrated sulfuric acid as a catalyst. Subsequent reactions were conducted as in Example 3, whereby 672 g of the zinc salt of the salicylic acid resin having a softening point of 91° C. and a weight-average molecular weight of 980 were obtained in a red-dish brown, clear form.

EXAMPLE 6

In a similar manner to Example 5 except that 780 g (7.5 moles in terms of styrene) of a styrene composition containing 12.3 wt. % of the styrene dimer component was employed, the zinc salt of the salicylic acid resin having a softening point of 86° C. and a weight-average molecular weight of 1150 were obtained.

COMPARATIVE EXAMPLE 1

The first-stage reaction was conducted in a similar manner to Example 1 except that 15.2 g (0.1 mole) of methyl salicylate were reacted with 41.7 g (0.4 mole) of styrene while using 3.8 g of 95% concentrated sulfuric acid as a catalyst.

Subsequent reactions were conducted as in Example 3, whereby 55.5 g of the zinc salt of the salicylic acid resin having a softening point of 95° C. and a weight-average molecular weight of 1050 were obtained in a reddish brown, clear form.

benzyl chloride were added dropwise over 3 hours at an internal temperature of 70°-80° C. The resulting solution was then subjected to aging for 2 hours, whereby condensation was completed. The reaction mixture was thereafter heated under reduced pressure, so that 1,2-dichloroethane, that is, the solvent was distilled off. The salicylic acid resin so obtained was dissolved in an aqueous solution of 4.3 g of caustic soda in 1000 ml of water, followed by the dropwise addition of a solution, which had been obtained in advance by dissolving 15.8 g (0.055 mole) of zinc sulfate 7 hydrate in 50 ml of water. White precipitate so obtained was collected by filtration, washed with water and then dried, whereby poly(-zinc benzylsalicylate) was obtained.

COMPARATIVE EXAMPLE 4

To 120 ml of chlorobenzene, a mixture consisting of 55.2 g of salicylic acid and 2 g of concentrated sulfuric acid was added Styrene (124.8 g) was added to the solution at about 50°-60° C. The resulting mixture was then stirred at 130° C. for 3 hours. The clear solution so obtained was cooled, followed by the addition of 43.8 g of zinc acetate dihydrate at 50° C. The solvents were all removed b vacuum distillation. The zinc salt of the salicylic acid resin thus obtained was a soft, pale yellow resin having an average molecular weight of 400.

TABLE 1

| Example | Performance of Color-Developing Sheet: Production of blue color (20° C., 65% RH): Produced color density (Y) 1.5 min later | 24 hrs later | Light fastness of produced color marks (Y): Fadeometer 2 hrs. | Fadeometer 4 hrs. | Sunlight 5 days | Plasticizer resistance of produced color marks (Y) | Waterproofness of produced color marks | Color production at low temperature (5° C., 60% RH) Produced color density (Y): 1.5 min later | 24 hrs later |
|---|---|---|---|---|---|---|---|---|---|
| Example 1 | 56.0 | 54.7 | 59.9 | 67.0 | 65.7 | 55.0 | Good | 61.2 | 55.6 |
| Example 2 | 57.1 | 55.1 | 60.4 | 67.5 | 67.4 | 54.9 | Good | 61.9 | 56.4 |
| Example 3 | 56.3 | 55.0 | 61.3 | 68.0 | 66.9 | 54.3 | Good | 60.3 | 56.9 |
| Example 4 | 56.9 | 54.7 | 61.0 | 68.9 | 70.0 | 55.2 | Good | 62.0 | 55.7 |
| Example 5 | 56.1 | 54.2 | 60.1 | 67.7 | 67.2 | 54.1 | Good | 61.5 | 55.2 |
| Example 6 | 56.0 | 54.3 | 60.5 | 68.4 | 67.8 | 54.4 | Good | 60.8 | 54.9 |
| Comp. Ex. 1 | 57.5 | 54.5 | 61.3 | 70.1 | 72.5 | 55.5 | Good | 61.5 | 55.2 |
| Comp. Ex. 2 | 59.9 | 56.1 | 65.0 | 71.1 | 77.4 | 60.0 | Disappeared | 69.9 | 58.5 |
| Comp. Ex. 3 | 58.6 | 55.0 | 70.5 | 77.2 | Disappeared | 54.9 | Good | 64.5 | 57.9 |
| Comp. Ex. 4 | 57.2 | 55.9 | 64.7 | 74.1 | 75.8 | 57.0 | Fair | 59.6 | 56.7 |

COMPARATIVE EXAMPLE 2

Zinc 3,5-di(α-methylbenzyl)salicylate

COMPARATIVE EXAMPLE 3

Charged in a glass reactor were 13.8 g (0.1 mole) of salicylic acid, 0.5 g of anhydrous zinc chloride and 50 ml of 1,2-dichloroethane, to which 50.6 g (0.4 mole) of

TABLE 2

| Example/ Comparative example | Yellowing of Color-Developing Sheet: Yellowing before test (WB value) | $No_X$ yellowing (WB value) | | Yellowing caused by 4-hr exposure to light from fadeometer (WB value) | | Yellowing caused by 5-day exposure to sunlight (WB value) | |
|---|---|---|---|---|---|---|---|
| Example 1 | 84.9 | 82.3 | (2.6) | 83.0 | (1.9) | 80.8 | (4.1) |
| Example 2 | 84.2 | 82.1 | (2.1) | 82.2 | (2.0) | 79.8 | (4.4) |
| Example 3 | 85.0 | 82.6 | (2.4) | 83.2 | (1.8) | 80.8 | (4.2) |
| Example 4 | 85.2 | 83.2 | (2.0) | 83.1 | (2.1) | 81.1 | (6.1) |
| Example 5 | 84.8 | 82.8 | (2.0) | 83.0 | (1.8) | 80.8 | (4.0) |
| Example 6 | 85.3 | 83.5 | (1.8) | 83.3 | (2.0) | 81.0 | (4.3) |
| Comp. Ex. 1 | 84.9 | 82.9 | (2.0) | 82.4 | (2.5) | 77.7 | (7.2) |
| Comp. Ex. 2 | 84.5 | 81.4 | (3.1) | 77.1 | (7.4) | 74.1 | (10.4) |
| Comp. Ex. 3 | 83.2 | 79.4 | (3.8) | 72.6 | (10.6) | 69.5 | (13.7) |
| Comp. Ex. 4 | 84.1 | 81.1 | (3.0) | 80.0 | (4.1) | 74.9 | (9.2) |

*Each value in parentheses is the difference between the WB value before test and that after the test.

TABLE 3

| Color-Developing Speed of Color-Developing Sheet Exposed to Sunlight for 5 Days, and Density of Produced Color | | |
|---|---|---|
| Example/ Comparative example | Production of blue color (20° C., 65% RH) Produced color density (Y) 1.5 min later | 24 hrs later |
| Example 1 | 59.9 | 56.3 |
| Example 2 | 60.5 | 56.8 |
| Example 3 | 60.5 | 57.0 |
| Example 4 | 62.8 | 58.2 |
| Example 5 | 59.7 | 56.2 |
| Example 6 | 62.0 | 57.0 |
| Comp. Ex. 1 | 64.3 | 59.2 |
| Comp. Ex. 2 | 68.5 | 64.3 |
| Comp. Ex. 3 | No color production | No color production |
| Comp. Ex. 4 | 67.0 | 62.7 |

As has been demonstrated above in the Examples, each multivalent-metal-modified salicylic acid resin according to the present invention is prepared by using inexpensive raw materials and through simple steps. A color-developing sheet for a pressure-sensitive copying paper sheet, said color-developing sheet making use of the multivalent-metal-modified salicylic acid resin, requires smaller coat weights of the color-developing component and coating formulation and allows to change the concentration, viscosity and the like of the coating formulation over relatively broad ranges, respectively, thereby permitting both on-machine coating and off-machine coating. This can bring about a large merit in the fabrication steps of a pressure-sensitive paper sheet.

Each color developing sheet according to this invention is free from yellowing by light or a gas such as nitrogen oxides or the like in the air. Further, produced color marks are stable to light, plasticizer and the like, is not reduced in the color density and has good waterproofness. Its utility can therefore be expanded to fields to which conventional products are not suited because of the requirement for stability during long-term storage. The color-developing sheet has extremely great practical significance.

Before describing examples on aqueous suspensions of this invention, various performance testing methods will be described next.

A) PROPERTIES OF AQUEOUS SUSPENSIONS

Color Hue

Four sheets, which have been produced by coating a wood free paper web with an aqueous suspension by a Mayer bar to give a dry coat weight of 5 g/m$^2$ (sheets coated with the aqueous suspension), were stacked one over another and measured by a "Σ-80 Color Difference Meter" (manufactured by Nippon Denshoku Kogyo K. K.). The measurement results are expressed in terms of a WB value.

A greater WB value indicates that the aqueous suspension is whiter. A difference in WB point as great as about 1 point or so makes it possible to visually determine superiority or inferiority.

Viscosity

After the solid content of an aqueous suspension obtained by comminution is adjusted to 40 wt. %, the viscosity of the thus-adjusted suspension is measured by a Brookfield viscometer. The viscosity is expressed by a value so measured (measurement conditions: 25° C., No. 1 rotor, 60 rpm, unit: cps).

High-temperature Storage Stability

Two kilograms of an aqueous suspension were charged in a stainless beaker having an internal volume of 3 l. While the aqueous suspension was stirred at 100 rpm by a glass-made stirring blade (anchor type, 100 mm in diameter), the aqueous suspension was stored at 40° C. for 1 week. Its filterability before storage and that after the storage were compared with each other in terms of the filtration time (sec) through a 200-mesh sieve of 7.5 cm in diameter.

In the case of a dispersion having poor high-temperature storage stability, the color-developing composition comprising the multivalent-metal-modified salicylic acid resin coagulates in the aqueous suspension, so that the particle size increases and the sieve filterability is reduced.

B) PROPERTIES OF WATER-BASE COATING FORMULATIONS

Using the aqueous suspensions of the examples and comparative examples, water-base coating formulations (solid content: 50%) of the following composition were prepared and their properties were then measured.

| Component | Parts by weight (solid proportions) |
|---|---|
| (a) Aqueous suspension (as the color-developing composition comprising the multivalent-metal-modified salicylic acid resin in the suspension) | 18 |
| (b) Light calcium carbonate | 100 |
| (c) Styrene-butadiene latex | 6 |
| (d) Oxidized starch | 6 |
| (e) Poly(sodium acrylate) (pigment dispersant) | 0.5 |

Viscosity

Occurrence of an increase in viscosity was determined by a Brookfield viscometer (No. 3 rotor, 60 rpm). The preferred viscosity is in a range of 300–1000 cps.

Mechanical stability

Using each of the above-described water-base coating formulation having 50% solid content, the amount of a formed coagulum was measured by a Malone mechanical stability tester in accordance with JIS K-8392 (Testing Method for NBR Synthetic Latex) (measurement conditions: 100 g sample quantity, 1 000 rpm, 10 min, 20 kg load). The amount so measured is used as an index for the mechanical stability of the water-base coating formulation. The water-base coating formulation was filtered through a 200-mesh sieve after the test, the amount of the coagulum (after absolute drying) is measured. The results are expressed in terms of percent coagulum formation (%).

A water-base coating formulation whose percent coagulum formation is found to have a large value by the above testing method tends to develop breakage of the dispersed state of the water-base coating formulation or a coating trouble due to coagulation or the like upon its high-speed coating which gives strong shear force, for example, when the water-base coating formulation is applied by the blade coating method or the gate roll coating method.

C) PERFORMANCE AS PRESSURE-SENSITIVE COPYING PAPER SHEETS

Each water-base coating formulation which had been employed in the above-described measurement of its mechanical stability by the Malone mechanical stability tester was coated by a Mayer bar on a wood free paper web to give a dry coat weight of 5 $g/m^2$, followed by drying to produce color-developing sheets.

Color-producing Speed and Produced Color Density (Conducted in an Air-conditioned Room of 20° C., 65% RH)

A commercial blue-color producing CB-sheet containing Crystal Violet Lactone (CVL) as a principal pressure-sensitive dyestuff precursor ("N-40", trade name; product of Mitsubishi Paper Mills, Ltd) was used. It was combined with the above color-developing sheet. The thus-combined pressure-sensitive copying paper was typed by a typewriter to produce a color. The reflectance of the color-developing sheet was measured twice, namely, 1 minutes and 30 seconds after the typing and 24 hours after the typing by the "Σ-80 Color Difference Meter". The results are expressed in terms of Y value.

Whiteness of Color-developing Sheets

Four of the above color-developing sheets were stacked one over another, and the reflectance was measured by the "Σ-80 Color Difference Meter". The results are expressed in terms of Y value.

A difference in WB point as great as about 1 point or so makes it possible to visually determine the whiteness of the color-developing sheets.

Yellowing By $NO_x$

Following JIS L-1055 (Testing Method for $NO_x$ Gas Fastness of Dyed Materials and Dyes), each color-developing sheet was stored for 1 hour in a closed vessel of an atmosphere of $NO_x$ occurred by the reaction of $NaNO_2$ (sodium nitrite) and $H_3PO_4$ (phosphoric acid). The degree of its yellowing was investigated.

Upon an elapsed time of 1 hour after completion of the storage, the reflectance of the color developing sheet was measured by the "Σ-80 Color Difference Meter". The measurement results are expressed in terms of WB value. The greater the WB value and the smaller its difference from the WB value of the sheet not exposed to the $NO_x$ gas (indicated under "Yellowing before test" in Table 2), the smaller the yellowing property in an $NO_x$ atmosphere.

EXAMPLE 7

In an aqueous solution which had been obtained by mixing 25 g of a 20% aqueous solution of polyvinyl alcohol (average polymerization degree: 300, saponification degree: 90%) having 5 mole % of sodium 2-acrylamido-2-methylpropanesulfonate units with 85 g of water and adjusting the pH of the resultant mixture to 8.0, 100 g of the fine resin powder obtained in Example 1 were charged. They were stirred into a slurry and then, processed for 2 hours with glass beads having a diameter of 1 mm in a sand grinder, whereby an aqueous white suspension (solid content: 50 wt. %) having an average particle size of 2.4 μm was obtained.

EXAMPLE 8

An ethylenesulfonic acid-vinyl acetate copolymer containing 3 mole % of ethylenesulfonic acid was saponified with caustic soda, whereby polyvinyl alcohol (average polymerization degree: 300) containing sulfonic acid groups and acetyl groups in amounts equivalent to 3 mole % and 1 mole %, respectively, was obtained. In an aqueous solution obtained by mixing 25 g of a 20% aqueous solution of the sulfonic-containing polyvinyl alcohol with 85 g of water and adjusting the pH of the resultant mixture to 8.4, 100 g of the fine resin powder obtained in Example 2 were charged. They were stirred into a slurry and then, processed for 2 hours in an attritor (manufactured by Mitsui Miike Seisakusho; zirconium medium of 5 mm in diameter) under water cooling, whereby an aqueous white suspension (solid content: 45 wt. %) having an average particle size of 2.1 μm was obtained.

EXAMPLE 9

In an aqueous solution obtained by mixing 15 g of a 20% aqueous solution of polyvinyl alcohol (average polymerization degree: 250, saponification degree: 88%) containing 5 mole % of ethylenesulfonic acid, 4.5 g of a 33% aqueous solution of the sodium salt of polystyrenesulfonic acid ("Caron 3301" trade name; product of Lion Corporation) and 109 g of water and adjusting the pH of the resultant mixture to 8.0, 100 g of the fine resin powder obtained in Example 3 were charged. They were stirred into a slurry and then, processed for 2 hours with glass beads having a diameter of 1 mm in a sand grinder, whereby an aqueous white suspension (solid content: 50 wt. %) having an average particle size of 2.1 μm was obtained.

EXAMPLE 10

In an aqueous solution obtained by mixing 25 g of a 20% aqueous solution of the sodium salt of polystyrenesulfonic acid (molecular weight: 10000, saponification degree: 70%) with 85 g of water and adjusting the pH of the resultant mixture to 8.0, 100 g of the fine resin powder obtained in Example 1 were charged. They were stirred into a slurry and then, processed with glass beads having a diameter of 1 mm in a sand grinder for 2 hours, whereby an aqueous white suspension (solid content: 50 wt. %) having an average particle size of 2.2 μm was obtained.

EXAMPLE 11

In an aqueous solution obtained by mixing 25 g of a 20% aqueous solution of ammonium polystyrenesulfonate salt ("Chemistadt 6500", trade name; product of Sanyo Chemical Industries, Ltd.) and 85 g of water and adjusting the pH of the resultant mixture to 8.0, 100 g of the fine resin powder obtained in Example 1 were charged. They were stirred into a slurry and then, processed with glass beads having a diameter of 1 mm in a sand grinder for 2 hours, whereby an aqueous white suspension (solid content: 50 wt. %) having an average particle size of 2.4 μm was obtained.

EXAMPLE 12

In an aqueous solution obtained by mixing 15 g of a 20% aqueous solution of polyvinyl alcohol (average polymerization degree: 250, saponification degree: 88%), which contained 5 mole % of ethylenesulfonic acid, and 5 g of a 30% aqueous solution of sodium salt of polystyrenesulfonic acid ("OKS-3376", trade name; product of The Nippon Synthetic Chemical Industry Co., Ltd.) with 89 g of water and adjusting the pH of the resultant mixture to 8.0, 100 g of the fine resin powder obtained in Example 1 were charged. They were stirred into a slurry and then, processed with glass beads having a diameter of 1 mm in a closed-type sand grinder (Dynomill) for 1.5 hours, whereby an aqueous white suspension (solid content: 50 wt. %) having an average particle size of 2.1 μm was obtained.

EXAMPLE 13

In an aqueous solution obtained by mixing 17 g of a 30% aqueous solution of the sodium salt of a sulfonated styrene-maleic acid copolymer ("SMA-1000", trade name; product of Arco Inc.) with 93 g of water and adjusting the pH of the resultant mixture to 8.0, 100 g of the fine resin powder obtained in Example 3 were charged. They were stirred into a slurry and then, processed with glass beads having a diameter of 1 mm in a sand grinder for 2 hours, whereby an aqueous white suspension (solid content: 50 wt. %) having an average particle size of 2.5 μm was obtained.

COMPARATIVE EXAMPLE 5

Processing was conducted in a similar manner to Example 7 except for the replacement of sulfonic-containing polyvinyl alcohol by the sodium salt of a formaldehyde-naphthalenesulfonic acid condensation product. The 50% solid content was, however, too high to conduct dispersion. The suspension was hence diluted to 40% with water, whereby an aqueous white suspension having an average particle size of 3.1 μm was obtained.

COMPARATIVE EXAMPLE 6

Processing was conducted in a similar manner to Example 7 except for the replacement of sulfonic-containing polyvinyl alcohol by partially-saponified polyvinyl alcohol ("Poval 117", trade name; product of Kuraray Co., Ltd.). Because of intensive foaming and viscosity increase, the slurry so obtained became no longer dispersible in several tens minutes after the processing in the sand grinder was started. The solid content was diluted further with water to 40%, whereby an aqueous white suspension having an average particle size of 2.8 μm was obtained. Even after the completion of the processing, it took 24 hours until all the foams disappeared. The working efficiency was therefore extremely inferior.

COMPARATIVE EXAMPLE 7

In an aqueous solution of 10 g of sodium ligninsulfonate salt ("Ozan CD", trade name; product of ITT Reonior Inc.) in 134 g of water, 100 g of the fine resin powder obtained in Example 2 were dispersed, followed by the formation of a slurry. The slurry was treated in a sand grinder similarly to Example 7, whereby an aqueous brown suspension having an average particle size of 2.5 μm and a solid content of 45 wt. % was obtained.

COMPARATIVE EXAMPLE 8

As a result of the processing in a similar manner to Example 7 except for the replacement of the sulfonic-containing polyvinyl alcohol by an equal amount of sodium salt of polycarboxylic acid ("Polystar OM", trade name; product of NOF CORPORATION), the slurry so obtained turned into a solid paste because of poor dispersion. Accordingly, no aqueous suspension was obtained.

The aqueous suspension obtained in the above-described examples and comparative examples, water-base coating formulations prepared using the aqueous suspensions in accordance with the above-described method and pressure-sensitive copying paper sheets obtained by coating the water-base coating formulations were evaluated by the above-described testing methods, respectively. The results are summarized in Tables 4 and 5.

TABLE 4

Performance of Aqueous Suspension and Water-Base Coating Formulation

| | Properties of aqueous suspension | | | | | Properties of water-base coating formulation | |
|---|---|---|---|---|---|---|---|
| | Hue (reflectance) (%) | Viscosity (cps) | Filtering time (sec) | Storage stability at high temperatures (Change in particle size, μm) Before test | After test | Viscosity (cps) | Amount of formed aggregates (%, as measured by Malone stability tester) |
| Example 7 | 83.2 | 17.8 | 28 | 2.5 | 2.5 | 485 | 0.03 |
| Example 8 | 83.2 | 20.1 | 31 | 2.3 | 2.3 | 490 | 0.02 |
| Example 9 | 83.0 | 18.2 | 32 | 2.1 | 2.1 | 475 | 0.03 |
| Example 10 | 83.1 | 19.5 | 23 | 2.1 | 2.2 | 490 | 0.05 |
| Example 11 | 83.0 | 17.0 | 31 | 2.0 | 2.0 | 495 | 0.06 |
| Example 12 | 82.9 | 21.5 | 35 | 2.4 | 2.5 | 490 | 0.05 |
| Example 13 | 83.1 | 23.1 | 33 | 2.3 | 2.4 | 490 | 0.05 |
| Comp. Ex. 5 | 75.9 | 88.0 | 250 | 2.9 | 7.5 | 620 | 2.3 |
| Comp. Ex. 6 | 82.5 | 112 | 85 | 2.7 | 2.8 | 850 | 0.05 |
| Comp. Ex. 7 | 62.3 | 76.0 | 510 | 2.5 | 2.7 | 820 | 0.75 |
| Comp. Ex. 8 | — | — | — | — | — | — | — |

TABLE 5

Performance As Pressure-Sensitive Copying Paper

| | Performance as pressure-sensitive copying paper | | | |
|---|---|---|---|---|
| | Color-producing performance (reflectance) (Y) Initial | Final | Whiteness of color-developing sheet (WB) | Yellowing Resistance to $NO_x$ (ΔL) |
| Example 7 | 55.1 | 53.5 | 82.6 | 2.6 |
| Example 8 | 55.8 | 54.0 | 82.5 | 2.6 |
| Example 9 | 55.3 | 53.9 | 82.5 | 2.7 |
| Example 10 | 55.5 | 53.8 | 82.6 | 2.5 |
| Exampel 11 | 55.8 | 54.3 | 82.6 | 2.9 |
| Example 12 | 55.9 | 54.5 | 82.5 | 2.7 |
| Example 13 | 55.6 | 54.2 | 82.4 | 2.8 |
| Comp. Ex. 5 | 55.5 | 53.9 | 78.8 | 12.5 |
| Comp. Ex. 6 | 57.2 | 54.6 | 82.2 | 2.8 |
| Comp. Ex. 7 | 55.9 | 54.3 | 76.8 | 19.4 |
| Comp. Ex. 8 | — | — | — | — |

As is apparent from Tables 4 and 5, it is understood that, because the present invention employs an anionic aqueous high molecular substance of this invention as a dispersant upon obtaining an aqueous suspension of the color-developing composition, the aqueous suspension of the color-developing composition can be prepared with excellent features such as:

1) the suspension is colored less, 2) the color-developing composition is dispersed extremely stably so that the suspension produces less coagulum or precipitate even when stored at high temperatures over a long period of time, 3) viscosity increase and foaming are minimized during preparation of the aqueous suspension, 4) a resulting coating formulation for the fabrication of pressure-sensitive copying paper sheets has excellent thermal and mechanical stability, and 5) excellent pressure-sensitive copying paper sheets can be afforded, in which upon exposure to light or during storage, the dispersant itself is not yellowed so that the pressure-sensitive copying paper sheets are protected from quality deterioration.

We claim:

1. A color-developing composition comprising a multivalent-metal-modified salicylic acid resin having a softening point of 50°-180° C. and a weight average molecular weight of 500-10,000, said resin having been obtained from and produced by the consecutive steps of:

(i) reacting (A) a salicylic acid ester represented by the following formula (I):

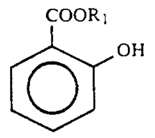

(I)

wherein $R_1$ means an alkyl group having 1-12 carbon atoms, an aralkyl group, an aryl group or a cycloalkyl group, with a mixture of (B) a styrene represented by the following formula (II):

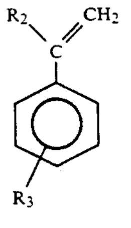

(II)

wherein $R_2$ means a hydrogen atom or a methyl group and $R_3$ denotes a hydrogen atom or an alkyl group having 1-4 carbon atoms, and (C) at least one styrene dimer represented by the following formula (III) or (IV):

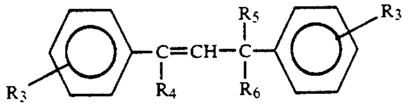

(III)

-continued

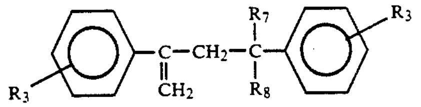

(IV)

wherein $R_3$ has the same meaning as defined above and $R_4$-$R_8$ each mean a hydrogen atom or a methyl group, by:

i) reacting a mixture of the styrene (B) and the styrene dimer (C) with the salicylic acid ester (A) to produce a salicylic acid ester resin, ii) hydrolyzing the thus-produced salicylic acid ester resin, thereby producing a salicylic acid resin, and iii) reacting the thus-produced salicyclic acid resin with a multivalent metal salt to convert the salicylic acid resin into its multivalent metal salt, wherein the molar ratio of the salicylic acid ester (A) to the styrene (B) plus twice the styrene dimer (C) [(A)/{(B)+2(C)}] ranges from 1/1.5 to 1/20 with the weight ratio of the styrene (B) to the styrene dimer (C) [(B)/(C)] being in a range of from 5/95 to 95/5.

2. The color-developing composition of claim 1, wherein in the multivalent-metal-modified salicylic acid resin, the multivalent metal is selected from the group consisting of calcium, magnesium, aluminum, copper, zinc, tin, barium, cobalt and nickel.

3. The color-developing composition of claim 1, wherein in the multivalent-metal-modified salicylic acid resin, the multivalent metal is zinc.

4. The color-developing composition of claim 1, wherein in the multivalent-metal-modified salicylic acid resin, the molar ratio (A)/{(B)+2(C)} ranges from ½ to 1/10 with the weight ratio (B)/(C) being in a range of from 50/50 to 95/5.

5. The color-developing composition of claim 4, wherein in the multivalent-metal-modified salicylic acid resin, the multivalent metal is zinc.

6. The color-developing composition of claim 1, wherein in the multivalent-metal-modified salicylic acid resin, the molar ratio (A)/{(B)+2(C)} ranges from ½ to 1/10 with the weight ratio (B)/(C) being in a range of from 70/30 to 90/10.

7. The color-developing composition of claim 6, wherein in the multivalent-metal-modified salicylic acid resin, the multivalent metal is zinc.

8. A color-developing sheet comprising the color-developing composition of claim 1.

9. An aqueous suspension of a color-developing composition prepared by finely wet-grinding the color-developing composition of claim 1 in the presence of at least one anionic, water-soluble, high molecular substance selected from the group consisting of:

a) polyvinyl alcohol derivatives containing at least one sulfonic acid group in the molecules thereof, and salts thereof; and b) polymers and copolymers containing as an essential component a styrenesulfonic acid salt represented by the following formula (V):

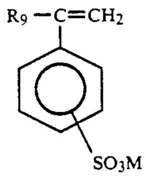

(V)

wherein $R_9$ means a hydrogen atom or an alkyl group having 1-5 carbon atoms and M denotes $Na^+$, $K^+$, $Cs^+$, $Fr^+$ or $NH_4^+$.

10. A color-developing sheet comprising the color-developing composition of claim 1, wherein in the multivalent-metal-modified salicylic acid resin, the multivalent metal is selected from the group consisting of calcium, magnesium, aluminum, copper, zinc, tin, barium, cobalt and nickel.

11. A color-developing sheet comprising the color-developing composition of claim 1, wherein in the multivalent-metal-modified salicylic acid resin, the multivalent metal is zinc.

12. A color-developing sheet comprising the color-developing composition of claim 1, wherein in the multivalent-metal-modified salicylic acid resin, the molar ratio (A)/{(B)+2(C)} ranges from ½ to 1/10 with the weight ratio (B)/(C) being in a range of from 50/50 to 95/5.

13. A color-developing sheet comprising the color-developing composition of claim 4, wherein in the multivalent-metal-modified salicylic acid resin, the multivalent metal is zinc.

14. A color-developing sheet comprising the color-developing composition of claim 1, wherein in the multivalent-metal-modified salicylic acid resin, the molar ratio (A)/{(B)+2(C)} ranges from ½ to 1/10 with the weight ratio (B)/(C) being in a range of from 70/30 to 90/10.

15. A color-developing sheet comprising the color-developing composition of claim 6, wherein in the multivalent-metal-modified salicylic acid resin, the multivalent metal is zinc.

* * * * *